United States Patent
Farrand et al.

(10) Patent No.: US 10,308,744 B2
(45) Date of Patent: *Jun. 4, 2019

(54) PARTICLES FOR ELECTROPHORETIC DISPLAYS

(71) Applicants: Merck Patent GmbH, Darmstadt (DE); The Queen's University of Belfast, Belfast (GB)

(72) Inventors: Louise D. Farrand, Dorset (GB); Nils Greinert, Seeheim-Jugenheim (DE); Jonathan H. Wilson, Southampton (GB); Thomas Bauer, Darmstadt (DE); Claire Topping, Southampton (GB); Sarah Norman, Chilton (GB)

(73) Assignees: Merck Patent GmbH (DE); The Queen's University of Belfast (GB)

( * ) Notice: Subject to any disclaimer, the term of this patent is extended or adjusted under 35 U.S.C. 154(b) by 39 days.

This patent is subject to a terminal disclaimer.

(21) Appl. No.: 14/896,835

(22) PCT Filed: May 20, 2014

(86) PCT No.: PCT/EP2014/001355
§ 371 (c)(1),
(2) Date: Dec. 8, 2015

(87) PCT Pub. No.: WO2014/198375
PCT Pub. Date: Dec. 18, 2014

(65) Prior Publication Data
US 2016/0137767 A1    May 19, 2016

(30) Foreign Application Priority Data
Jun. 12, 2013  (EP) .................... 13003003

(51) Int. Cl.
| | | |
|---|---|---|
| *C08F 2/14* | (2006.01) | |
| *C08F 220/18* | (2006.01) | |
| *C08F 2/26* | (2006.01) | |
| *C08F 220/14* | (2006.01) | |
| *C09B 69/10* | (2006.01) | |
| *C09D 5/44* | (2006.01) | |
| *G02F 1/1675* | (2019.01) | |

(52) U.S. Cl.
CPC .............. *C08F 220/18* (2013.01); *C08F 2/14* (2013.01); *C08F 2/26* (2013.01); *C08F 220/14* (2013.01); *C09B 69/106* (2013.01); *C09D 5/4411* (2013.01); *G02F 2001/1678* (2013.01)

(58) Field of Classification Search
CPC .. C08F 2/14; C08F 2/26; C08F 220/14; C08F 220/18; C08F 2220/382
See application file for complete search history.

(56) References Cited

U.S. PATENT DOCUMENTS

| | | |
|---|---|---|
| 5,380,362 A | 1/1995 | Schubert |
| 5,403,518 A | 4/1995 | Schubert |
| 5,783,614 A | 7/1998 | Chen et al. |
| 6,194,488 B1 | 2/2001 | Chen et al. |
| 6,956,690 B2 | 10/2005 | Yu et al. |
| 7,038,655 B2 | 5/2006 | Herb et al. |
| 7,052,766 B2 | 5/2006 | Zang et al. |
| 7,110,162 B2 | 9/2006 | Wu et al. |
| 7,170,670 B2 | 1/2007 | Webber |
| 7,226,550 B2 | 6/2007 | Hou et al. |
| 7,236,290 B1 | 6/2007 | Zhang et al. |
| 7,247,379 B2 | 7/2007 | Pullen et al. |
| 7,277,218 B2 | 10/2007 | Hwang et al. |
| 7,304,634 B2 | 12/2007 | Albert et al. |
| 9,182,615 B2 * | 11/2015 | Greinert .................. G02F 1/167 |
| 2007/0128352 A1 | 6/2007 | Honeyman et al. |
| 2007/0268244 A1 | 11/2007 | Chopra et al. |
| 2009/0207476 A1 * | 8/2009 | Yanagisawa ........ C08F 290/068 359/296 |
| 2010/0002287 A1 | 1/2010 | Naijo et al. |
| 2012/0329355 A1 | 12/2012 | Liang et al. |
| 2015/0129817 A1 | 5/2015 | Farrand et al. |

FOREIGN PATENT DOCUMENTS

| | | |
|---|---|---|
| GB | 2438436 A | 11/2007 |
| WO | WO-99/10767 A1 | 3/1999 |
| WO | WO-2005017046 A2 | 2/2005 |
| WO | WO-2009100803 A2 | 8/2009 |
| WO | WO-2010050949 A1 | 5/2010 |
| WO | WO-2010089057 A2 | 8/2010 |
| WO | WO-2010089058 A1 | 8/2010 |
| WO | WO-2010089059 A1 | 8/2010 |
| WO | WO-2010089060 A2 | 8/2010 |
| WO | WO-2010104606 A1 | 9/2010 |
| WO | WO-2011017446 A1 | 2/2011 |
| WO | WO-2011075720 A1 | 6/2011 |
| WO | WO-2011154103 A1 | 12/2011 |
| WO | WO-2012019704 A1 | 2/2012 |
| WO | WO-2012072218 A1 | 6/2012 |
| WO | WO 2012072218 A1 * | 6/2012 ............. G02F 1/167 |
| WO | WO-2013079146 A1 | 6/2013 |
| WO | WO-2013170934 A1 | 11/2013 |

OTHER PUBLICATIONS

Shaplov et al (Polymer Chemistry, 2011, 2, pp. 2609-2618).*
Shaplov et al, "Polymeric Ionic Liquid . . . Polyanions"; Macromolecules, 2011, 44, 9792-9803; Nov. 2011.*
Earle, M., et al., "Ionic liquids. Green solvents for the future", Pure and Applied Chemistry, vol. 72, No. 7, (2000), pp. 1391-1398.
Hagiwara, R., et al., "Room temperature ionic liquids of alkylimidazolium cations and fluoroanions", Journal of Fluorine Chemistry, vol. 105, (2000), pp. 221-227.
International Search Report for PCT/EP2014/001355 dated Jul. 30, 2014.

(Continued)

*Primary Examiner* — Karuna P Reddy
(74) *Attorney, Agent, or Firm* — Drinker Biddle & Reath LLP

(57) ABSTRACT

This invention relates to polymer particles, a process for their preparation, electrophoretic fluids comprising such particles, and electrophoretic display devices comprising such fluids.

22 Claims, No Drawings

(56) References Cited

OTHER PUBLICATIONS

Shaplov, A., et al., "Polymeric Ionic Liquids: Comparison of Polycations and Polyanions", Macromolecules, vol. 44, No. 24, (2011), pp. 9792-9803.
Sheldon, R., "Catalytic reactions in ionic liquids", Chemical Communications, (2001), pp. 2399-2407.
Wasserscheid, P., et al., "Ionische Flüssigkeiten—neue „Lösungen" für die Übergangsmetallkatalyse, Angewandte Chemie, vol. 112, (2000), pp. 3926-3945.
Welton, T., "Room-Temperature Ionic Liquids. Solvents for Synthesis and Catalysis", Chemical Reviews, vol. 99, No. 8, (1999), pp. 2071-2083.
U.S. Appl. No. 14/896,842, filed Dec. 8, 2015, Farrand et al.

* cited by examiner

PARTICLES FOR ELECTROPHORETIC DISPLAYS

CROSS-REFERENCE TO RELATED APPLICATIONS

This application is a national stage application (under 35 U.S.C. § 371) of PCT/EP2014/001355, filed May 20, 2014, which claims benefit of European Application No. 13003003.4, filed Jun. 12, 2013, both of which are incorporated herein by reference in their entirety.

This invention relates to polymer particles, a process for their preparation, electrophoretic fluids comprising such particles, electrophoretic display devices comprising such fluids, and the use of the particles in optical, electrooptical, electronic, electrochemical, electrophotographic, electrowetting and electrophoretic displays and/or devices, in security, cosmetic, decorative or diagnostic applications.

EPDs (Electrophoretic Displays) and their use for electronic paper are known for a number of years. An EPD generally comprises charged electrophoretic particles dispersed between two substrates, each comprising one or more electrodes. The space between the electrodes is filled with a dispersion medium which is a different colour from the colour of the particles. If a voltage is applied between the electrodes, charged particles move to the electrode of opposite polarity. The particles can cover the observer's side electrode, so that a colour identical to the colour of the particles is displayed when an image is observed from the observer's side. Any image can be observed using a multiplicity of pixels. Mainly black and white particles are used. Available technologies of EPDs include electronic paper, commercially used in electronic books. This application uses black and white colour. The use of different coloured particles in a single pixel has been exemplified in recent patent literature (U.S. Pat. No. 7,304,634, GB 2 438 436, US 2007/0268244).

An important characteristic of particles intended for use in an electrophoretic fluid is that the particles carry a charge. Only the charge will allow the particles to be moved under an electric filed and hence enable the display pixel to be switched between two optical states. The traditional approach of creating charged species in low dielectric constant media is by the addition of surfactants that form micelles of sufficient size. It is believed that the charges on the particle are created by abstraction or addition of an ion or proton from the particle. The created charge is then contained in the core of the micelles and stabilised against recombination with the oppositely charged counterpart. The use of this charging method is well established.

The situation is further complicated in the development of real-life formulations for EPD applications. In many cases, at least two different particle species are present in the formulation and often more than one surfactant is used. A typical formulation will therefore consist of a complicated and dynamic set of interactions between the different particle surfaces, surfactants, and dispersion medium. Additionally, the equilibria may change under the influence of the electric field.

An alternative route of inducing charge to particles in an EPD fluid is described in WO 2010/050949 where a charge is fixed to a polymeric shell. However, this method requires good access to the particle surface, which may be blocked by a steric stabilisation layer, and availability of reactive groups, which may not be present. WO 2012/072218 describes particles having a charge fixed by a polymerisable cation. However, there continues to be a need for improved electrophoretic fluids and polymer particles which can be easily prepared and dispersed in non-polar media.

The present invention relates to polymer particles comprising monomer units of a) at least one ethylenically unsaturated monomer; b) at least one polymerisable ionic liquid $X—R-A^-C^+$ wherein X is a polymerisable group, R is a spacer group, $A^-$ is an anion, and $C^+$ is a cation; c) optionally at least one polymerisable dye, and d) optionally at least one polymerisable steric stabiliser, a process for their preparation, the use of polymer particles in electrophoretic fluids, and electrophoretic display devices comprising these fluids.

The subject matter of this invention specifically relates to coloured polymer particles and especially to black polymer particles, and to electrophoretic fluids and displays comprising such coloured polymer particles and/or black polymer particles.

The present invention provides an EPD particle having a charge permanently fixed by covalently bound anions and soft, bulky cations. These polymer particles are prepared by copolymerising a polymerisable ionic liquid having a polymerisable anion during particle synthesis.

Advantages of the invention are: controlling of sign of the particle charge, no unbound charging agent in the dispersion medium, and/or no charge polydispersity. The use of an ionic liquid with a polymerisable group enables the charge to become irreversibly chemically bound and well entangled in the polymer particle, thus avoiding, the presence of charging material in the dispersion medium. This reduces undesired effects like shielding of the electric field and fluid transport phenomenon like electro-hydrodynamic instability.

The invention can provide high performance EPD particles which exhibit zeta potentials of more than 50 mV or even more than 100 mV. This potential directly influences the velocity of the particle movement under the influence of the electric field and thus the display switching speed and performance. Furthermore, the invention provides a one-step reaction to provide coloured particles suitable for EPD, without the requirement of freeze or spray drying enabling a cost effective production process. No transfer of solvents is required.

The term polymerisable ionic liquid (PIL) throughout this invention means an ionic liquid $A^-C^+$ with a polymerisable group attached to the anion via a spacer group. The term ionic liquid refers to organic salts that usually have melting point's below 373 K. Review articles on ionic liquids are, for example: R. Sheldon "Catalytic reactions in ionic liquids", *Chem. Commun.*, 2001, 2399-2407; M. J. Earle, K. R. Seddon "Ionic liquids. Green solvent for the future", *Pure Appl. Chem.*, 72 (2000), 1391-1398; P. Wasserscheid, W. Keim "Ionische Flüssigkeiten—neue Lösungen für die Übergangsmetallkatalyse" [Ionic Liquids—Novel Solutions for Transition-Metal Catalysis], *Angew. Chem.*, 112 (2000), 3926-3945; T. Welton "Room temperature ionic liquids. Solvents for synthesis and catalysis", *Chem. Rev.*, 92 (1999), 2071-2083; or R. Hagiwara, Ya. Ito "Room temperature ionic liquids of alkylimidazolium cations and fluoroanions", *J. Fluorine Chem.*, 105 (2000), 221-227.

Ionic liquid molecules provide soft, bulky ions that have the ability to dissociate in low dielectric constant liquids. In the present invention an ionic liquid is used where the anion is modified with a polymerisable group to incorporate soft, bulky ions in polymer particles. The polymerisable ionic liquid is copolymerised with an ethylenically unsaturated monomer during particle synthesis. The polymerisable ionic liquids X—R-A⁻C⁺ according to the invention contain a polymerisable group X, a spacer group R, an anion A⁻, and a cation C⁺.

The polymerisable group X can be any polymerisable group like methacrylates, acrylates, methacrylamides, acrylonitriles, α-substituted acrylates, styrenes, vinyl, and substituted vinyl. Especially preferred are methacrylates and acrylates, especially methacrylates.

The spacer group R can be an alkylene chain, polyether, poly-dialkylsiloxane. Spacer group R may be for example a group -(A-B)$_m$- with A=linear or branched alkylene, preferably with 1 to 12 carbon atoms, especially with 1 to 4 carbon atoms, B=O or S, preferably O, and m=0 to 5, preferably 1 to 3. In particular, the spacer group R is a group-(CH$_2$CHR—O)$_m$— with m=0 to 5, preferably 1 to 3, and R=H or C$_{1-4}$-alkyl, especially H or CH$_3$.

The anion A⁻ can be, for example, a borate, imide, phosphate, sulfonate, sulfate, succinate, naphthenate or carboxylate. Especially, the following anions A⁻ are used (abbreviations in brackets): 3-Sulfopropylmethacrylate (SPMA) and 3-Sulfopropylacrylate (SPA)

The cation C⁺ can be an organic cation, such as, for example, a phosphonium, sulfonium, ammonium, uronium, thiouronium, guanidinium or heterocyclic cations such as imidazolium, pyridinium, pyrrolidinium, triazolium, morpholinium or piperidinium cation.

From the group of the ammonium, phosphonium or sulfonium cations, preference is given to the compounds of the formulae (1), (2) and (3):

[NR$_4$]⁺ (1),

[PR$_4$]⁺ (2),

[SR$_3$]⁺ (3), where
R in each case, independently of one another, denotes
a straight-chain or branched alkyl having 1-20 C atoms, which optionally can be partially fluorinated, but not in α-position to hetero-atom, and which can also include oxygen or/and sulfur atoms in any positions in between carbon atoms;
saturated, partially or fully unsaturated cycloalkyl having 5-7 C atoms, which may be substituted by alkyl groups having 1-6 C atoms.

Especially, cations are preferred where R in each case stands for a straight-chain or branched alkyl having 4-20 C atoms, preferably 4-10 C atoms.

From the group of heterocyclic cations, preference is given to the compounds selected from the group:

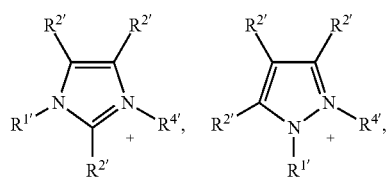

imidazolium    1H-pyrazolium

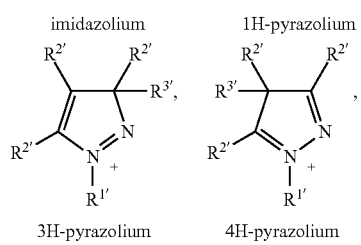

3H-pyrazolium    4H-pyrazolium

-continued

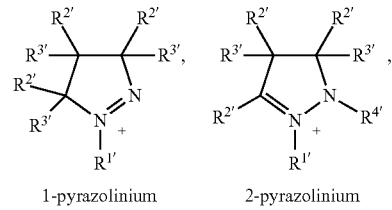

1-pyrazolinium    2-pyrazolinium

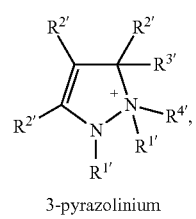 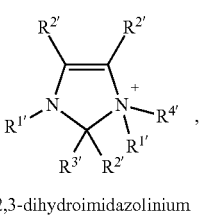

3-pyrazolinium    2,3-dihydroimidazolinium

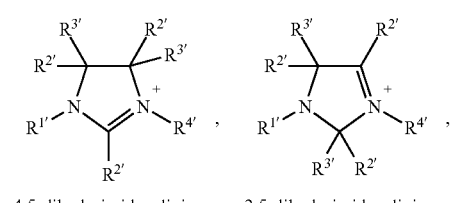 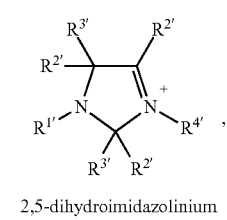

4,5-dihydroimidazolinium    2,5-dihydroimidazolinium

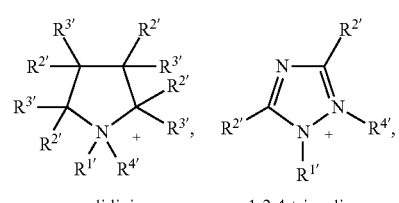 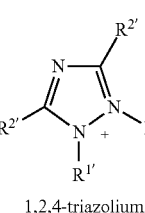

pyrrolidinium    1,2,4-triazolium

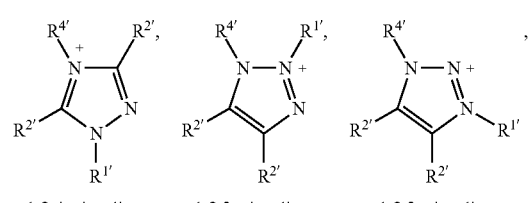 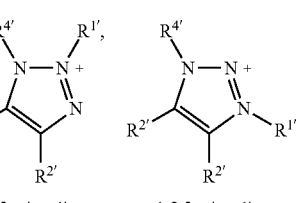

1,2,4-triazolium    1,2,3-triazolium    1,2,3-triazolium

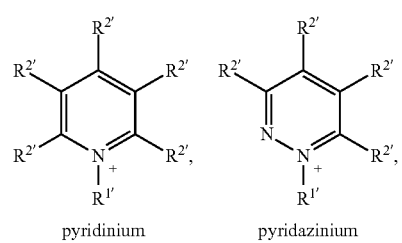 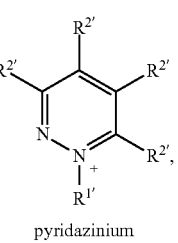

pyridinium    pyridazinium

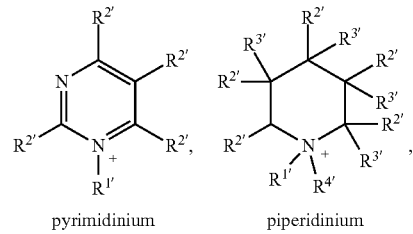 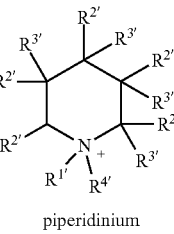

pyrimidinium    piperidinium

-continued

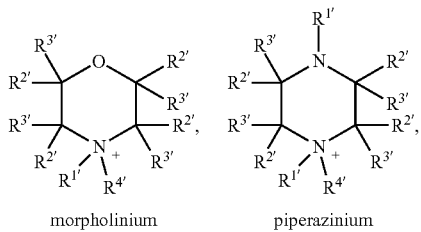
morpholinium    piperazinium

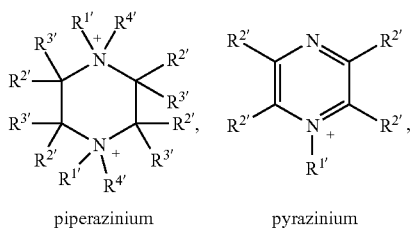
piperazinium    pyrazinium

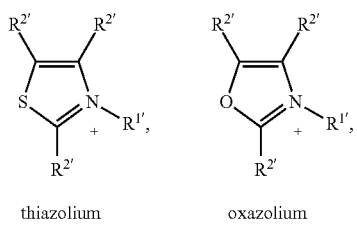
thiazolium    oxazolium

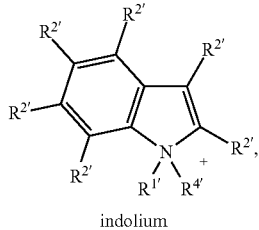
indolium

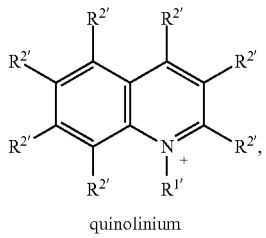
quinolinium

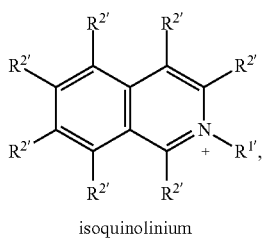
isoquinolinium

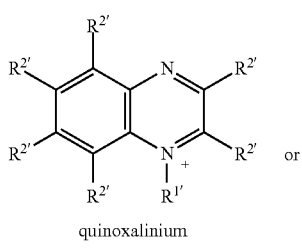
quinoxalinium

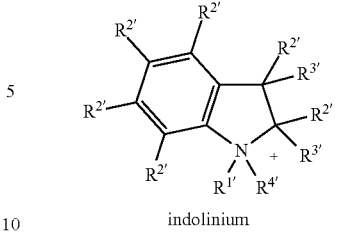
indolinium where the substituents
$R^{1'}$ to $R^{4'}$ each, independently of one another, denote
a straight-chain or branched alkyl having 1-20 C atoms, which optionally can be partially fluorinated, but not in α-position to hetero-atom, and which can also include oxygen or/and sulfur atoms in any positions in between carbon atoms;
saturated, partially or fully unsaturated cycloalkyl having 5-7 C atoms,
which may be substituted by alkyl groups having 1-6 C atoms,
where the substituents $R^{1'}$, $R^{2'}$, $R^{3'}$ and/or $R^{4'}$ together may also form a ring system.

Preferably, the cation $C^+$ is a tetraalkylammonium, tetraalkylphosphonium, N-alkylpyridinium, N,N-dialkylpyrrolidinium, 1,3-dialkylimidazolium or trialkyl-sulfonium cation, especially tetraalkylammonium, tetraalkylphosphonium, or 1,3-dialkylimidazolium cation.

Especially, the following cations $C^+$ are used (abbreviations in brackets): tetrahexylammonium (N6666), tetradodecylammonium (N12121212), tetrabutylphosphonium (P4444), tetraoctylphosphonium (P8888), trihexyltetradecylphosphonium (P66614), methyloctylimidazolium (C8mim), dodecylmethylpyrrolidinium (C12mpyrr).

Examples of polymerisable ionic liquids $X-R-A^-C^+$ preferably suitable for the invention are listed in Table 1.

TABLE 1

| PIL | Cation | Anion |
|---|---|---|
| N6666 SPMA | $C_6H_{13}$, $C_6H_{13}$, N⁺, $C_6H_{13}$, $C_6H_{13}$ | methacryloyloxypropylsulfonate |
| N8888 SPMA | $C_8H_{17}$, $C_8H_{17}$, N⁺, $C_8H_{17}$, $C_8H_{17}$ | methacryloyloxypropylsulfonate |
| N4444 SPMA | $C_4H_9$, $C_4H_9$, N⁺, $C_4H_9$, $C_4H_9$ | methacryloyloxypropylsulfonate |
| N10101010 SPMA | $C_{10}H_{21}$, $C_{10}H_{21}$, N⁺, $C_{10}H_{21}$, $C_{10}H_{21}$ | methacryloyloxypropylsulfonate |
| N11111111 SPMA | $C_{11}H_{23}$, $C_{11}H_{23}$, N⁺, $C_{11}H_{23}$, $C_{11}H_{23}$ | methacryloyloxypropylsulfonate |

TABLE 1-continued

| PIL | Cation | Anion |
|---|---|---|
| N12121212 SPMA | 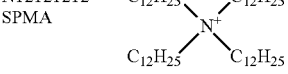 | 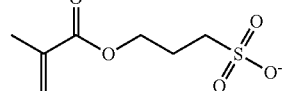 |
| N11116 SPMA | 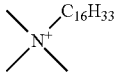 | 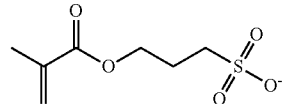 |
| P4444 SPMA | 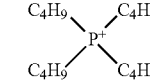 | 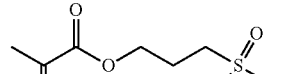 |
| P6666 SPMA | 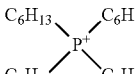 | 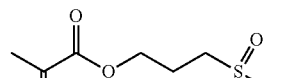 |
| P8888 SPMA | 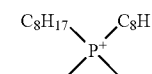 | 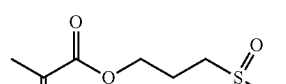 |
| P6614 SPMA | 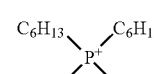 | 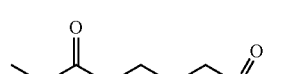 |
| C8mim SPMA | 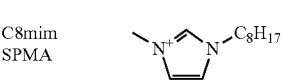 |  |
| C6mim SPMA | 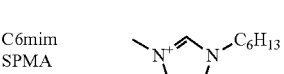 |  |
| C12mpyrr SPMA | 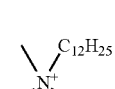 |  |
| N6666 SPA | 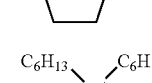 |  |
| N8888 SPA | 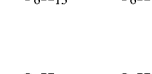 |  |
| N12121212 SPA | 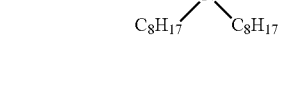 | 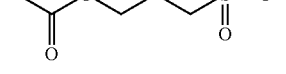 |
| P8888 SPA | 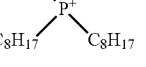 | 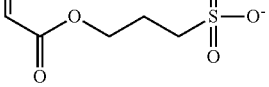 |
| C12mpyrr SPA | 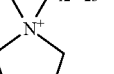 | 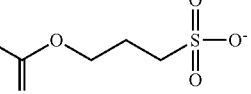 |

The polymerisable ionic liquids of the invention and/or their precursors are commercially available and/or can be synthesised by methods known to the person skilled in the art, for example, by ion exchange which can be carried out under conditions known to the person skilled in the art. The bromide salts used for the preparation of imidazolium and pyrrolidinium based ionic liquids are typically prepared according to Scheme 1. Anion exchange used for the preparation of all SPMA ionic liquids is shown in Scheme 2.

Scheme 1

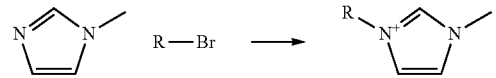

Scheme 2

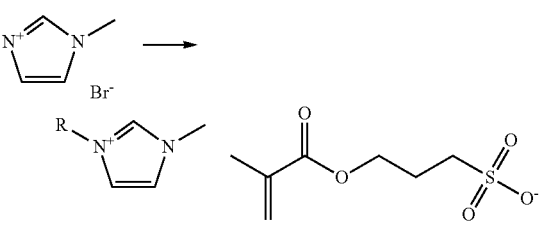

The preparation of further compounds according to the invention can be carried out analogously to the illustrative reactions shown above. The preparation of further compounds according to the invention can also be carried out by other methods known per se to the person skilled in the art from the literature. All process steps described above and below can be carried out using known techniques and standard equipments which are described in prior art and are well-known to the skilled person.

Usually, the polymer particles according to the invention comprise at least one polymerisable ionic liquid X—R-A$^-$C$^+$, at least one monomer, optionally at least one polymerisable dye, and optionally at least one polymerisable, steric stabiliser. Preferably, the particles according to the invention comprise a polymerisable ionic liquid X—R-A$^-$C$^+$, at least one monomer, at least one polymerisable dye, and at least one polymerisable steric stabiliser.

The particles can be prepared from most monomer types, in particular methacrylates, acrylates, acrylamides, methacrylamides, acrylonitriles, α-substituted acrylates, styrenes and vinyl ethers, vinyl esters, and propenyl ethers. The following are all examples which could be used and which are commercially available from the Sigma-Aldrich chemical company. Mixtures of monomers may also be used.

Methacrylates:

Methyl methacrylate (MMA), Ethyl methacrylate (EMA), n-Butyl methacrylate (BMA), 2-Aminoethyl methacrylate hydrochloride, Allyl methacrylate, Benzyl methacrylate, 2-Butoxyethyl methacrylate, 2-(tert-Butylamino)ethyl methacrylate, Butyl methacrylate, tert-Butyl methacrylate, Caprolactone 2-(methacryloyloxy)ethyl ester, 3-Chloro-2-hydroxypropyl methacrylate, Cyclohexyl methacrylate, 2-(Diethylamino)ethyl methacrylate, Di(ethylene glycol)methyl ether methacrylate, 2-(Dimethylamino)ethyl methacrylate, 2-Ethoxyethyl methacrylate, Ethylene glycol dicyclopentenyl ether methacrylate, Ethylene glycol methyl ether methacrylate, Ethylene glycol phenyl ether methacrylate, 2-Ethylhexyl methacrylate, Furfuryl methacrylate, Glycidyl methacrylate, Glycosyloxyethyl methacrylate, Hexyl methacrylate, Hydroxybutyl methacrylate, 2-Hydroxyethyl methacrylate, 2-Hydroxyethyl methacrylate, Hydroxypropyl methacrylate Mixture of hydroxypropyl and hydroxyisopropyl methacrylates, 2-Hydroxypropyl 2-(methacryloyloxy) ethyl phthalate, Isobornyl methacrylate, Isobutyl methacrylate, 2-Isocyanatoethyl methacrylate, Isodecyl methacrylate, Lauryl methacrylate, Methacryloyl chloride, Methacrylic acid, 2-(Methylthio)ethyl methacrylate, mono-2-(Methacryloyloxy)ethyl maleate, mono-2-(Methacryloyloxy)ethyl succinate, Pentabromophenyl methacrylate, Phenyl methacrylate, Phosphoric acid 2-hydroxyethyl methacrylate ester, Stearyl methacrylate, 3-Sulfopropyl methacrylate potassium salt, Tetrahydrofurfuryl methacrylate, 3-(Trichlorosilyl)propyl methacrylate, Tridecyl methacrylate, 3-(Trimethoxysilyl)propyl methacrylate, 3,3,5-Trimethylcyclohexyl methacrylate, Trimethylsilyl methacrylate, Vinyl methacrylate.

Preferably Methyl methacrylate (MMA), Methacrylic acid, Ethyl methacrylate (EMA), and/or n-Butyl methacrylate (BMA) are used.

Acrylates:

Acrylic acid, 4-Acryloylmorpholine, [2-(Acryloyloxy) ethyl]trimethylammonium chloride, 2-(4-Benzoyl-3-hydroxyphenoxy)ethyl acrylate, Benzyl 2-propylacrylate, 2-Butoxyethyl acrylate, Butyl acrylate, tert-Butyl acrylate, 2-[(Butylamino)carbonyl]oxy]ethyl acrylate, tert-Butyl 2-bromoacrylate, 4-tert-Butylcyclohexyl acrylate, 2-Carboxyethyl acrylate, 2-Carboxyethyl acrylate oligomers anhydrous, 2-(Diethylamino)ethyl acrylate, i(ethylene glycol)ethyl ether acrylate technical grade, Di(ethylene glycol) 2-ethylhexyl ether acrylate, 2-(Dimethylamino)ethyl acrylate, 3-(Dimethylamino)propyl acrylate, Dipentaerythritol penta-/hexa-acrylate, 2-Ethoxyethyl acrylate, Ethyl acrylate, 2-Ethylacryloyl chloride, Ethyl 2-(bromomethyl)acrylate, Ethyl cis-(β-cyano)acrylate, Ethylene glycol dicyclopentenyl ether acrylate, Ethylene glycol methyl ether acrylate, Ethylene glycol phenyl ether acrylate, Ethyl 2-ethylacrylate, 2-Ethylhexyl acrylate, Ethyl 2-propylacrylate, Ethyl 2-(trimethylsilylmethyl)acrylate, Hexyl acrylate, 4-Hydroxybutyl acrylate, 2-Hydroxyethyl acrylate, 2-Hydroxy-3-phenoxypropyl acrylate, Hydroxypropyl acrylate, Isobornyl acrylate, Isobutyl acrylate, Isodecyl acrylate, Isooctyl acrylate, Lauryl acrylate, Methyl 2-acetamidoacrylate, Methyl acrylate, Methyl α-bromoacrylate, Methyl 2-(bromomethyl)acrylate, Methyl 3-hydroxy-2-methylenebutyrate, Octadecyl acrylate, Pentabromobenzyl acrylate, Pentabromophenyl acrylate, Poly(ethylene glycol)methyl ether acrylate, Poly(propylene glycol)acrylate, Poly(propylene glycol)methyl ether acrylate Soybean oil, epoxidised acrylate, 3-Sulfopropyl acrylate potassium salt, Tetrahydrofurfuryl acrylate, 3-(Trimethoxysilyl)propyl acrylate, 3,5,5-Trimethylhexyl acrylate.

Preferably Methyl acrylate, acrylic acid, Ethyl acrylate (EMA), and/or n-Butyl acrylate (BMA) are used.

Acrylamides

2-Acrylamidoglycolic acid, 2-Acrylamido-2-methyl-1-propanesulfonic acid, 2-Acrylamido-2-methyl-1-propanesulfonic acid sodium salt solution, (3-Acrylamidopropyl) trimethylammonium chloride solution, 3-Acryloylamino-1-propanol solution purum, N-(Butoxymethyl)acrylamide, N-tert-Butylacrylamide, Diacetone acrylamide, N,N-Dimethylacrylamide, N-[3-(Dimethylamino)propyl]methacrylamide, N-Hydroxyethyl acrylamide, N-(Hydroxymethyl) acrylamide, N-(Isobutoxymethyl)acrylamide, N-Isopropylacrylamide, N-Isopropylmethacrylamide, Methacrylamide, N-Phenylacrylamide, N-[Tris(hydroxymethyl)methyl] acrylamide.

Styrenes

Styrene, Divinyl benzene, 4-Acetoxystyrene, 4-Benzyloxy-3-methoxystyrene, 2-Bromostyrene, 3-Bromostyrene, 4-Bromostyrene, α-Bromostyrene, 4-tert-Butoxystyrene, 4-tert-Butylstyrene, 4-Chloro-α-methylstyrene, 2-Chlorostyrene, 3-Chlorostyrene, 4-Chlorostyrene, 2,6-Dichlorostyrene, 2,6-Difluorostyrene, 1,3-Diisopropenylbenzene, 3,4-Dimethoxystyrene, α,2-Dimethylstyrene, 2,4-Dimethylstyrene, 2,5-Dimethylstyrene, N,N-Dimethylvinylbenzylamine, 2,4-Diphenyl-4-methyl-1-pentene, 4-Ethoxystyrene, 2-Fluorostyrene, 3-Fluorostyrene, 4-Fluorostyrene, 2-Isopropenylaniline, 3-Isopropenyl-α,α-dimethylbenzyl isocyanate, Methylstyrene, α-Methylstyrene, 3-Methylstyrene, 4-Methylstyrene, 3-Nitrostyrene, 2,3,4,5,6-Pentafluorostyrene, 2-(Trifluoromethyl)styrene, 3-(Trifluoromethyl) styrene, 4-(Trifluoromethyl)styrene, 2,4,6-Trimethylstyrene. Preferably Styrene and/or Divinyl benzene are used.

Vinyl Groups

3-Vinylaniline, 4-Vinylaniline, 4-Vinylpyridine, 4-Vinylanisole, 9-Vinylanthracene, 3-Vinylbenzoic acid, 4-Vinylbenzoic acid, Vinylbenzyl chloride, 4-Vinylbenzyl chloride, (Vinylbenzyl)trimethylammonium chloride, 4-Vinylbiphenyl, 2-Vinylnaphthalene, 2-Vinylpyridine, N-Vinyl-2-pyrrolidinone, 2-Vinylnaphthalene, Vinyl acetate, Vinyl benzoate, Vinyl 4-tert-butylbenzoate, Vinyl chloroformate, Vinyl chloroformate, Vinyl cinnamate, Vinyl decanoate, Vinyl neodecanoate, Vinyl neononanoate, Vinyl pivalate, Vinyl propionate, Vinyl stearate, Vinyl trifluoroacetate.

Other monomers which may be used are those which have groups to help stabilisation of the particles, e.g. Poly(ethylene glycol)methyl ether acrylate, Poly(ethylene glycol)phenyl ether acrylate, lauryl methacrylate, Poly(ethylene glycol)methyl ether acrylate, Poly(propylene glycol)methyl ether acrylate, Lauryl acrylate and fluorinated monomers of above.

Some of the monomers have groups for further reaction if so desired, e.g. Glycidyl ethacrylate, 2-Hydroxyethyl methacrylate.

The following compounds can be used as intraparticle crosslinking monomers for solubility control and solvent swelling resistance: ethylene glycol dimethacrylate (EGDMA), allyl methacrylate (ALMA), divinyl benzene, Bis[4-(vinyloxy)butyl]adipate, Bis[4-(vinyloxy)butyl]1,6-hexanediylbiscarbamate, Bis[4-(vinyloxy)butyl]isophthalate, Bis[4-(vinyloxy)butyl](methylenedi-4,1-phenylene) biscarbamate, Bis[4-(vinyloxy)butyl]succinate, Bis[4-(vinyloxy)butyl]terephthalate, Bis[4-(vinyloxymethyl) cyclohexylmethyl]glutarate, 1,4-Butanediol divinyl ether, 1,4-Butanediol vinyl ether, Butyl vinyl ether, tert-Butyl vinyl ether, 2-Chloroethyl vinyl ether, 1,4-Cyclohexanedimethanol divinyl ether, 1,4-Cyclohexanedimethanol vinyl ether, Di(ethylene glycol)divinyl ether, Di(ethylene glycol) vinyl ether, Ethylene glycol butyl vinyl ether, Ethylene glycol vinyl ether, Tris[4-(vinyloxy)butyl]trimellitate, 3-(Acryloyloxy)-2-hydroxypropyl methacrylate, Bis[2-(methacryloyloxy)ethyl]phosphate, Bisphenol A propoxylate diacrylate, 1,3-Butanediol diacrylate, 1,4-Butanediol diacrylate, 1,3-Butanediol dimethacrylate, 1,4-Butanediol dimethacrylate, N,N'-(1,2-Dihydroxyethylene)bisacrylamide, Di(trimethylolpropane)tetraacrylate, Diurethane dimethacrylate, N,N'-Ethylenebis(acrylamide), Glycerol 1,3-diglycerolate, Glycerol dimethacrylate, 1,6-Hexanediol diacrylate, 1,6-Hexanediol dimethacrylate, 1,6-Hexanediylbis[oxy(2-hydroxy-3,1-propanediyl)]bisacrylate, Hydroxypivalyl hydroxypivalate bis[6-(acryloyloxy) hexanoate], Neopentyl glycol diacrylate, Pentaerythritol diacrylate, Pentaerythritol tetraacrylate, Pentaerythritol triacrylate, Poly(propylene glycol)diacrylate, Poly(propylene glycol)dimethacrylate, 1,3,5-Triacryloylhexahydro-1,3,5-triazine, Tricyclo[5.2.1.0]decanedimethanol diacrylate, Trimethylolpropane benzoate diacrylate, Trimethylolpropane ethoxylate methyl ether diacrylate, Trimethylolpropane ethoxylate triacrylate, Trimethylolpropane triacrylate, Trimethylolpropane trimethacrylate, Tris[2-(acryloyloxy)ethyl] isocyanurate, Tri(propylene glycol)diacrylate.

Preferred monomers are methyl methacrylate and methacrylic acid, especially methyl methacrylate.

In a preferred variant of the invention, the polymer particles comprise at least one polymerisable dye comprising at least one polymerisable group, preferably at least two polymerisable groups. In general the polymerisable dyes may be solvent soluble or water soluble and they may be anionic, cationic, zwitterionic or neutral.

The polymerisable dye preferably comprises a chromophoric group and two polymerisable groups selected from e.g. methacrylates, acrylates, methacrylamides, acrylamides, acrylonitriles, α-substituted acrylates, styrenes and vinyl ethers, vinyl esters, propenyl ethers, oxetanes and epoxys etc., in particular methacrylates and acrylates.

A polymerisable dye may contain a single chromophore, for example with bright yellow, magenta or cyan colours and self shade blacks. However, it may also contain mixed covalently attached chromophores for example to obtain a black colour, by covalently attached brown and blue or yellow, magenta and cyan. Green can be obtained by yellow and cyan etc. Extended conjugated chromophores can also be used to obtain some shades. For example, bis- and trisazo compounds can be used to obtain blacks and other duller shades (navy blue, brown, olive green, etc).

Mixtures of polymerisable dyes can also be used to obtain the correct particle shade; for example a black from single component mixtures of brown and blue or yellow, magenta and cyan pre-polymerised dyes. Similarly shades can be tuned for example by adding small quantities of separate polymerisable dyes to modify the colour of the particles (e.g. 95% yellow and 5% cyan to get a greener yellow shade).

The polymerisable groups may be attached directly to the chromophoric group or may be attached through a linker group L.

The chromophoric group preferably comprises of conjugated aromatic (including heteroaromatic) and/or multiple bonds including: azo (including monoazo, bisazo, trisazo, linked azos etc), metallised azo, anthraquinone, pyrroline, phthalocyanine, polymethine, aryl-carbonium, triphendioxazine, diarylmethane, triarylmethane, anthraquinone, phthalocyanine, methine, polymethine, indoaniline, indophenol, stilbene, squarilium, aminoketone, xanthene, fluorone, acridene, quinolene, thiazole, azine, induline, nigrosine, oxazine, thiazine, indigoid, quinonioid, quinacridone, lactone, benzodifuranone, flavonol, chalone, polyene, chroman, nitro, naphtholactam, formazene or indolene group or a combination of two or more such groups.

Preferably dyes with more than one polymerisable group are used. In principle any polymerisable dye can be used, preferable with more than one polymerisable group (most preferably with 2 polymerisable groups) and preferably with a methacrylate or acrylate function. Advantageously, the polymerisable dyes disclosed in WO2010/089057, WO2012/019704, and WO 2013/079146 are used. Preferably dyes of Formulas (I')-(VI') are used:

(I')

(II')

(III')

(IV')

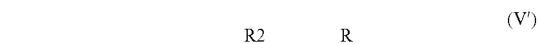

(V')

-continued

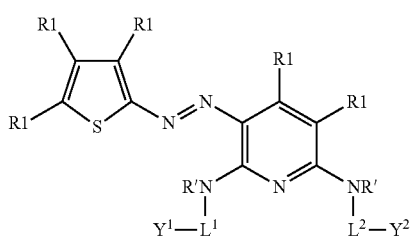
(VI')

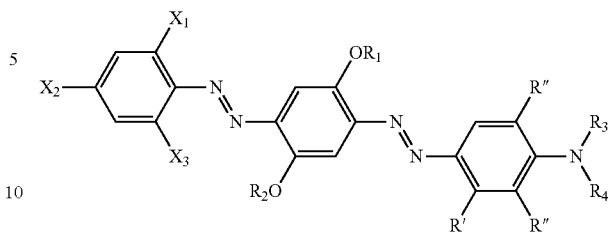
Formula (VIII)

wherein R is H; R1 and R2 are independently of one another alkyl, preferably C1-C6 alkyl, —OR', —SR', —C(O)R', —C(O)OR', —NHCOR', —NO$_2$, —CN, with R' equal to H or alkyl, preferably C1-C6 alkyl, especially C1-C3 alkyl; $L^1$ and $L^2$ are independently of one another a single bond, C1-C6 alkyl, a polyether alkyl chain, or a combination thereof, preferably C2-C4 alkyl, especially C2 and C4 alkyl, especially identical groups $L^1$ and $L^2$ are preferred; and $Y^1$ and $Y^2$ are methyl acrylate or methyl methacrylate, especially identical groups $Y^1$ and $Y^2$ are preferred.

Especially preferred are polymerisable dyes of Formulas (I')-(VI') wherein R is H; R1 and R2 are independently of one another —CH$_3$, —NO$_2$, —OH, —CN, —COCH$_3$, —CO$_2$CH$_2$CH$_3$, —NHCOR'; $L^1$ and $L^2$ are, preferably identical, C2-C4 alkyl, and $Y^1$ and $Y^2$ are, preferably identical, methyl acrylate or methyl methacrylate, wherein R2 is preferably —CH$_3$, —OH or —NHCOR'.

Also polymerisable dyes of Formula (VII) are preferably used.

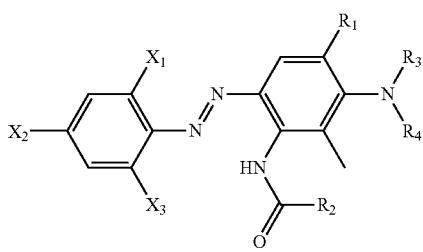
Formula (VII)

Wherein
$X_1$, $X_2$, and $X_3$ are independently of one another H or an electron-withdrawing group;
$R_1$ is H or OR' with R'=a linear, branched or cyclic alkyl group;
$R_2$ is a linear, branched or cyclic alkyl group;
$R_3$ and $R_4$ are independently of one another groups of the structure $L_3$-$Y_3$, $L_4$-$Y_4$;
$L_3$, and $L_4$ are linker groups and independently of one another linear or branched, substituted or unsubstituted alkylene groups where one or more non-adjacent carbon atoms may be replaced by O, S and/or N, preferably O;
$Y_3$, and $Y_4$ are independently of one another polymerisable groups;
Wherein at least one of $R_3$ and $R_4$ comprises a polymerisable group and at least one of $X_1$, $X_2$, and $X_3$ is an electron-withdrawing group.

Also polymerisable dyes of Formula (VIII) are preferably used.

Wherein
$X_1$, $X_2$, and $X_3$ are independently of one another H or an electron-withdrawing group;
$R_1$ and $R_2$ are independently of one another groups of the structure $L_1$-$Y_1$, $L_2$-$Y_2$ or linear, branched or cyclic alkyl groups;
$R_3$ and $R_4$ are independently of one another groups of the structure $L_3$-$Y_3$, $L_4$-$Y_4$ or linear, branched or cyclic, substituted or unsubstituted alkyl groups where one or more non-adjacent carbon atoms may be replaced by O, S and/or N, preferably O;
$L_1$, $L_2$, $L_3$, and $L_4$ are linker groups and independently of one another linear or branched, substituted or unsubstituted alkylene groups where one or more non-adjacent carbon atoms may be replaced by O, S and/or N, preferably O;
$Y_1$, $Y_2$, $Y_3$, and $Y_4$ are independently of one another polymerisable groups;
R' is a linear or branched alkyl group, OR$_5$, H, NHCOR$_6$ or NHSO$_2$R$_7$;
R" is OR$_5$, H or NHCOR$_6$,
$R_5$, $R_6$, and $R_7$ are independently of one another linear or branched alkyl groups; and
Wherein at least one of $R_1$, $R_2$, $R_3$ and $R_4$ is a polymerisable group and at least one of $X_1$, $X_2$, and $X_3$ is an electron-withdrawing group.

The following definitions concern Formulae (VII) and (VIII):

The term "electron-withdrawing group" is well known in the art and refers to the tendency of a substituent to attract valence electrons from neighbouring atoms; in other words the substituent is electronegative with respect to neighbouring atoms. Examples of electron-withdrawing groups include NO$_2$, CN, halogen, acyl, trifluoromethoxy, trifluoromethyl, SO$_2$F, and CO$_2$R, SO$_2$R, SO$_2$NRR or SO$_2$NHR, with R being independently linear or branched alkyl, preferably C1-C4 alkyl. Preferably, at least one of $X_1$, $X_2$, and $X_3$ is NO$_2$, CN, Br, Cl, SO$_2$NRR or SO$_2$NHR. Especially preferred are polymerisable dyes with $X_2$ and one of $X_1$ and $X_3$ being NO$_2$, CN, Br, Cl, SO$_2$NRR or SO$_2$NHR, preferably with R=methyl. Also preferred are polymerisable dyes with $X_2$ being NO$_2$, CN, Br, Cl, SO$_2$NRR or SO$_2$NHR, preferably with R=methyl, and $X_1$ and $X_3$ being H.

The polymerisable groups $Y_3$, and $Y_4$ may be selected from e.g. methacrylate, acrylate, methacrylamide, acrylamide, oxetanes, vinyl, vinyloxy, epoxy, allyl, propenyl ether, styryl groups, in particular methacrylate, acrylate, methacrylamide, and acrylamide. Preferably, groups $Y_3$, and $Y_4$ are selected from methacrylate and acrylate.

$R_1$ and $R_2$ are preferably C1-C20 alkyl groups, especially alkyl groups having 1 to 10 carbon atoms. C2-C8 alkyl groups are even more preferred. $R_3$ and $R_4$ are independently of one another groups of the structure $L_3$-$Y_3$ or $L_4$-$Y_4$, preferably $L_3$ and $L_4$ are independently of one another linear or branched C1-C20 alkylene groups, especially alkylene groups having 1 to 10 carbon atoms. Linear C2-C6 alkylene groups are even more preferred. Especially groups where $Y_3$ and $Y_4$ are methacrylate or acrylate are preferred. Especially identical groups $Y_3$ and $Y_4$ are preferred.

Preferred polymerisable dyes are in particular those dyes in which all variables have the preferred meanings. The following are examples of dyes which can preferably be used:

TABLE 2

Dye 1
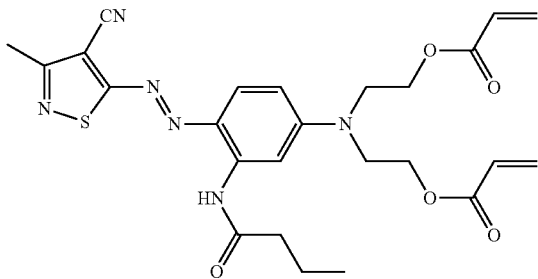 [SMILES: C=CC(=O)OCCN(CCOC(=O)C=C)c1ccc(/N=N/c2snc(C)c2C#N)c(NC(=O)CCC)c1]

Dye 2
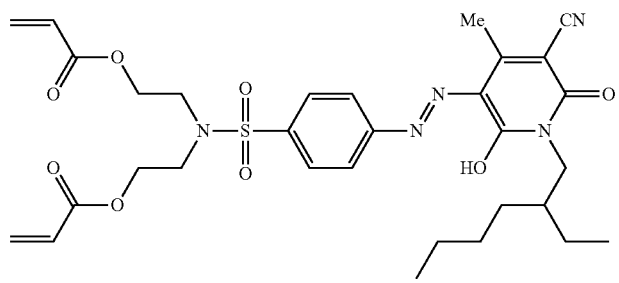 [SMILES: C=CC(=O)OCCN(CCOC(=O)C=C)S(=O)(=O)c1ccc(/N=N/c2c(C)c(C#N)c(=O)n(CC(CC)CCCC)c2O)cc1]

Dye 3
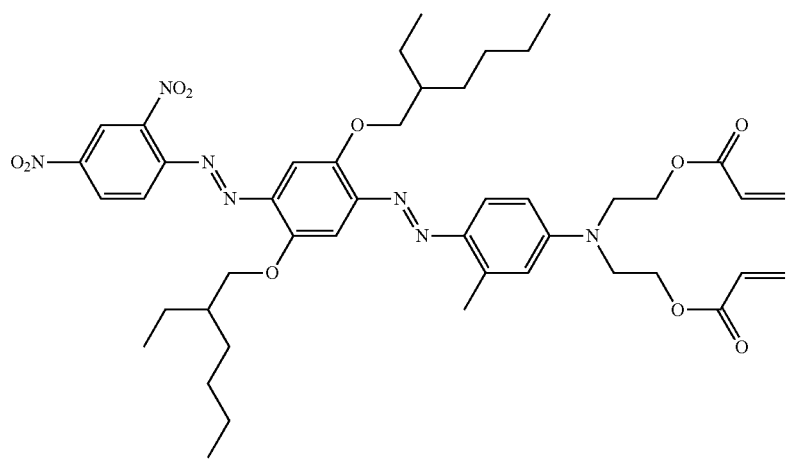 [SMILES: C=CC(=O)OCCN(CCOC(=O)C=C)c1ccc(/N=N/c2cc(OCC(CC)CCCC)c(/N=N/c3ccc([N+](=O)[O-])cc3[N+](=O)[O-])cc2OCC(CC)CCCC)c(C)c1]

Dye 4
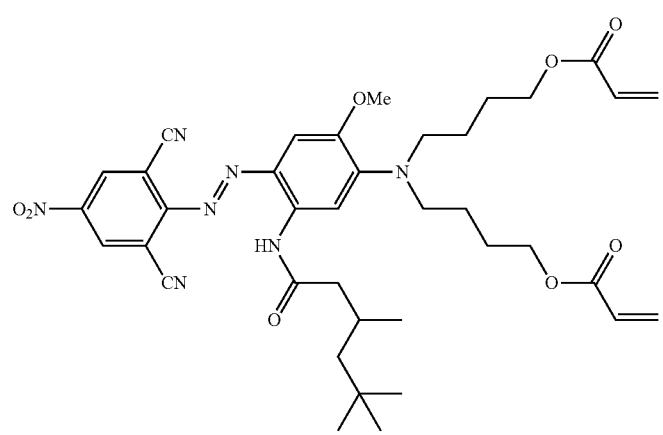 [SMILES: C=CC(=O)OCCCCN(CCCCOC(=O)C=C)c1cc(NC(=O)CC(C)CC(C)(C)C)c(/N=N/c2c(C#N)cc([N+](=O)[O-])cc2C#N)cc1OC]

TABLE 2-continued
Dye 5
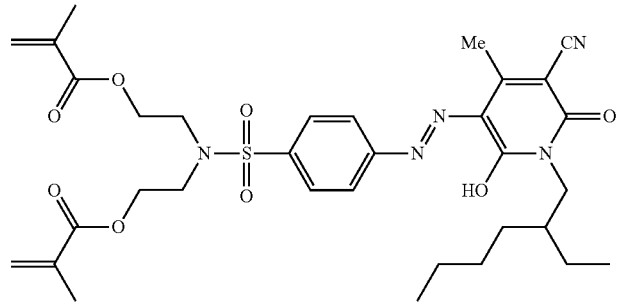 [SMILES: C=C(C)C(=O)OCCN(CCOC(=O)C(=C)C)S(=O)(=O)c1ccc(/N=N/c2c(C)c(C#N)c(=O)n(CC(CC)CCCC)c2O)cc1]
Dye 6
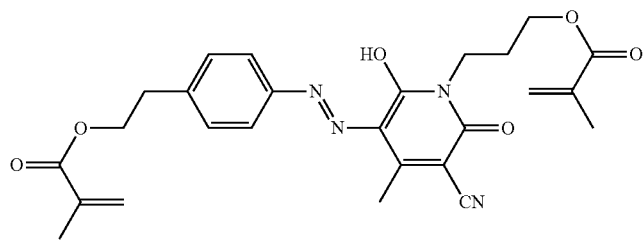 [SMILES: C=C(C)C(=O)OCCCn1c(O)c(/N=N/c2ccc(CCOC(=O)C(=C)C)cc2)c(C)c(C#N)c1=O]
Dye 7
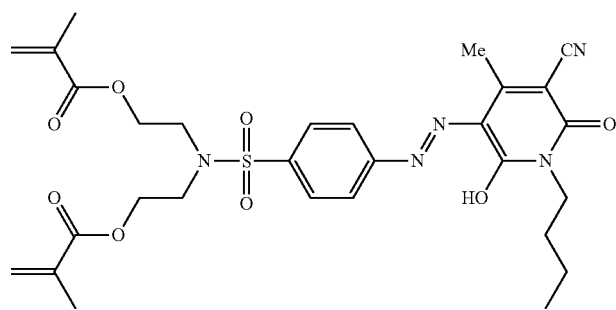 [SMILES: C=C(C)C(=O)OCCN(CCOC(=O)C(=C)C)S(=O)(=O)c1ccc(/N=N/c2c(C)c(C#N)c(=O)n(CCCC)c2O)cc1]
Dye 8
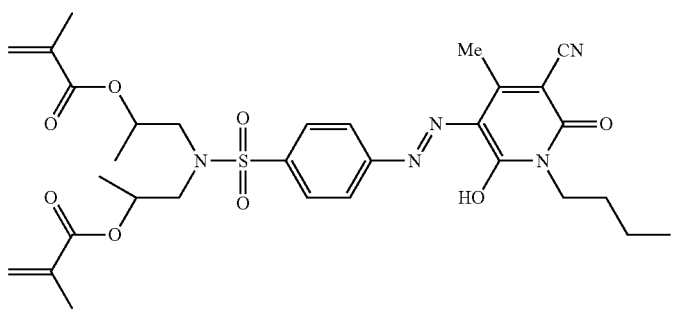 [SMILES: C=C(C)C(=O)OC(C)CN(CC(C)OC(=O)C(=C)C)S(=O)(=O)c1ccc(/N=N/c2c(C)c(C#N)c(=O)n(CCCC)c2O)cc1]
Dye 9
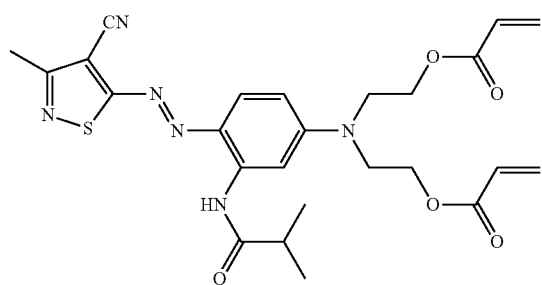 [SMILES: C=CC(=O)OCCN(CCOC(=O)C=C)c1ccc(/N=N/c2snc(C)c2C#N)c(NC(=O)C(C)C)c1]

TABLE 2-continued
Dye 10
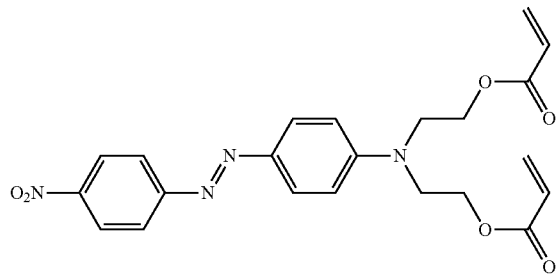 [SMILES: C=CC(=O)OCCN(CCOC(=O)C=C)c1ccc(/N=N/c2ccc([N+](=O)[O-])cc2)cc1]
Dye 11
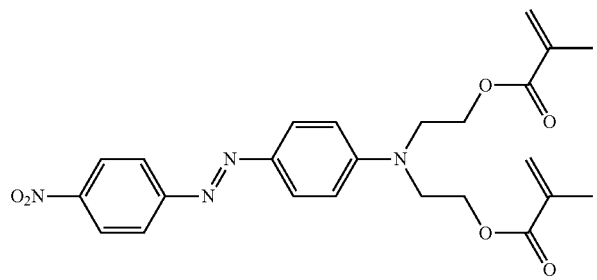 [SMILES: C=C(C)C(=O)OCCN(CCOC(=O)C(=C)C)c1ccc(/N=N/c2ccc([N+](=O)[O-])cc2)cc1]
Dye 12
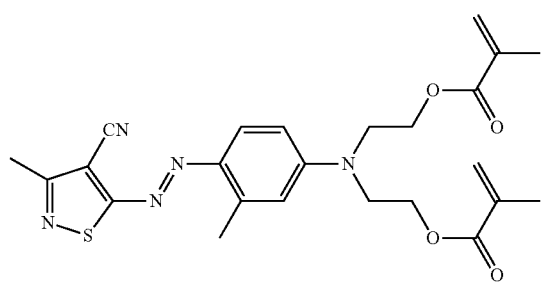 [SMILES: C=C(C)C(=O)OCCN(CCOC(=O)C(=C)C)c1ccc(/N=N/c2snc(C)c2C#N)c(C)c1]
Dye 13
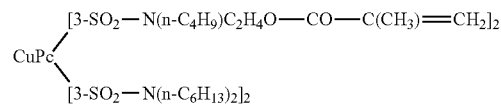
Dye 14
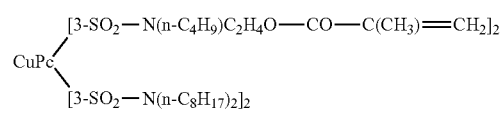
Dye 15
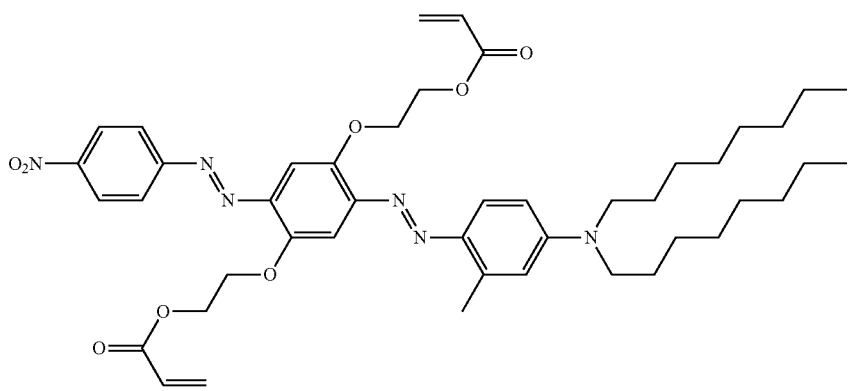 [SMILES: C=CC(=O)OCCOc1cc(/N=N/c2ccc(N(CCCCCCCC)CCCCCCCC)cc2C)c(OCCOC(=O)C=C)cc1/N=N/c1ccc([N+](=O)[O-])cc1]

TABLE 2-continued

Dye 16
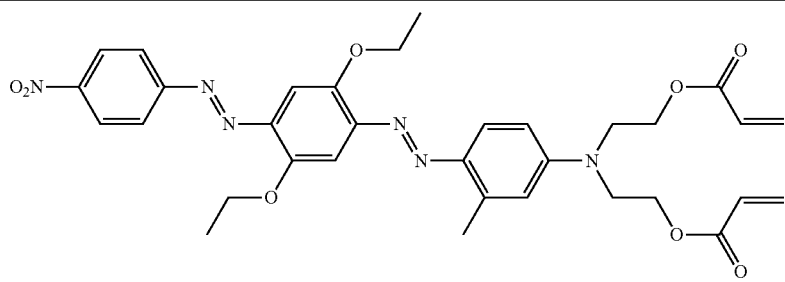

Dye 17
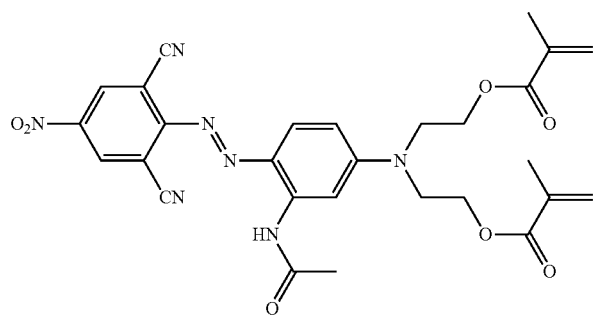 [SMILES: C=C(C)C(=O)OCCN(CCOC(=O)C(=C)C)c1ccc(/N=N/c2c(C#N)cc([N+](=O)[O-])cc2C#N)c(NC(C)=O)c1]

Dye 18
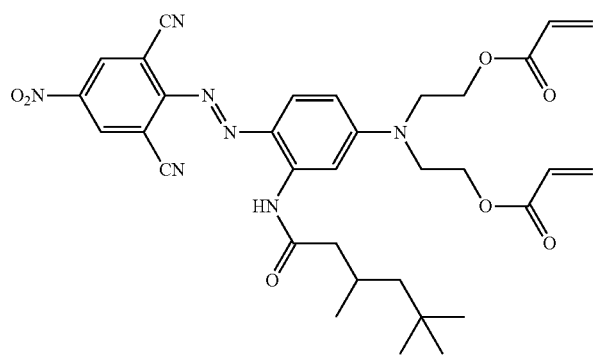 [SMILES: C=CC(=O)OCCN(CCOC(=O)C=C)c1ccc(/N=N/c2c(C#N)cc([N+](=O)[O-])cc2C#N)c(NC(=O)CC(C)CC(C)(C)C)c1]

Dye 19
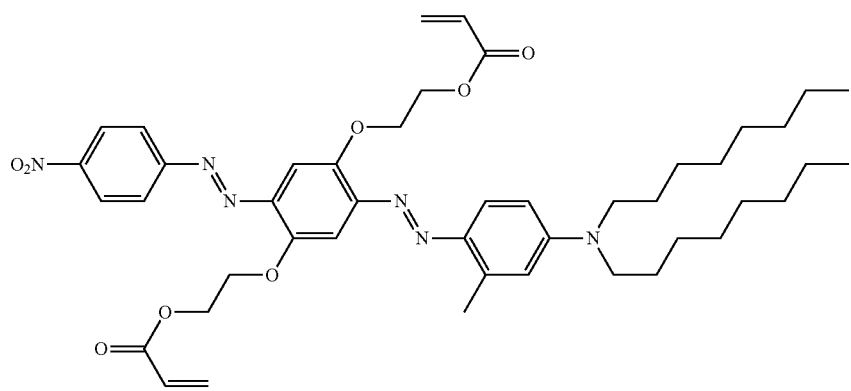 [SMILES: C=CC(=O)OCCOc1cc(/N=N/c2ccc(N(CCCCCCCC)CCCCCCCC)cc2C)c(OCCOC(=O)C=C)cc1/N=N/c1ccc([N+](=O)[O-])cc1]

Most preferred are the following dyes: Dye 1, Dye 2, and Dye 3.

Polymerisable dyes, especially the preferred polymerisable dyes can be prepared according to the processes described in WO2010/089057, WO2012/019704, and WO 2013/079146 especially according to WO2012/019704 and WO 2013/079146. The disclosures in the cited references are expressly part of the disclosure content of the present patent application.

The preparation of polymerisable dyes of Formula (VII) by a 7 step procedure under convenient conditions as known in the art is exemplified in the following scheme Dye 4:

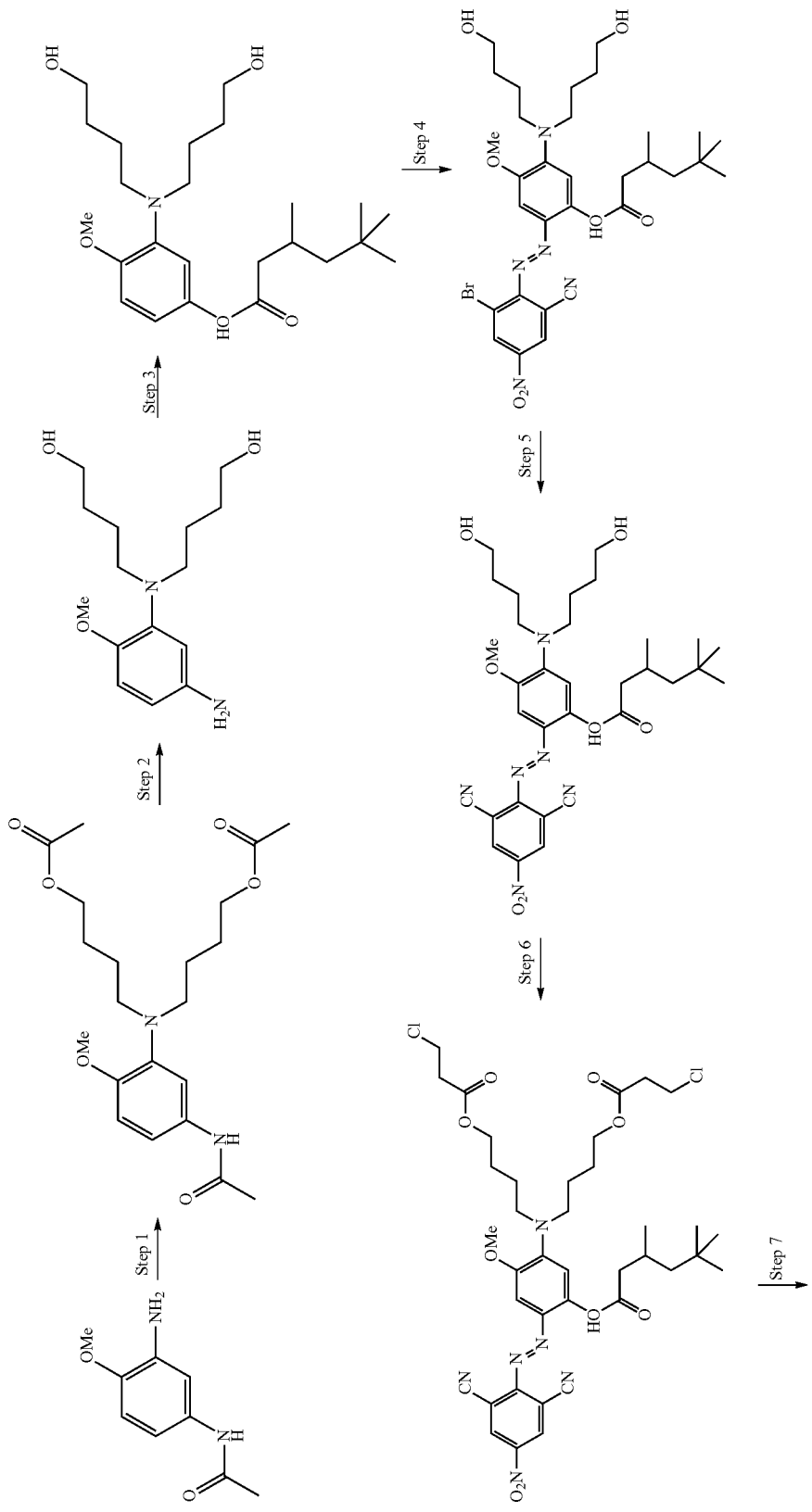

-continued
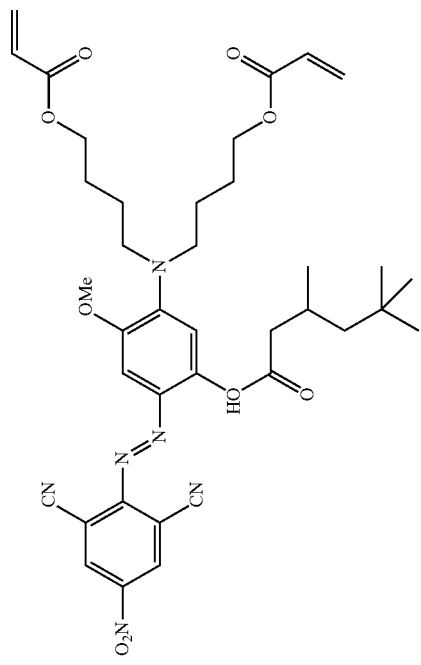

The preparation of polymerisable dyes of Formula (VIII) by a 5 procedure under convenient conditions as known in the art is exemplified in the following scheme for Dye 19:

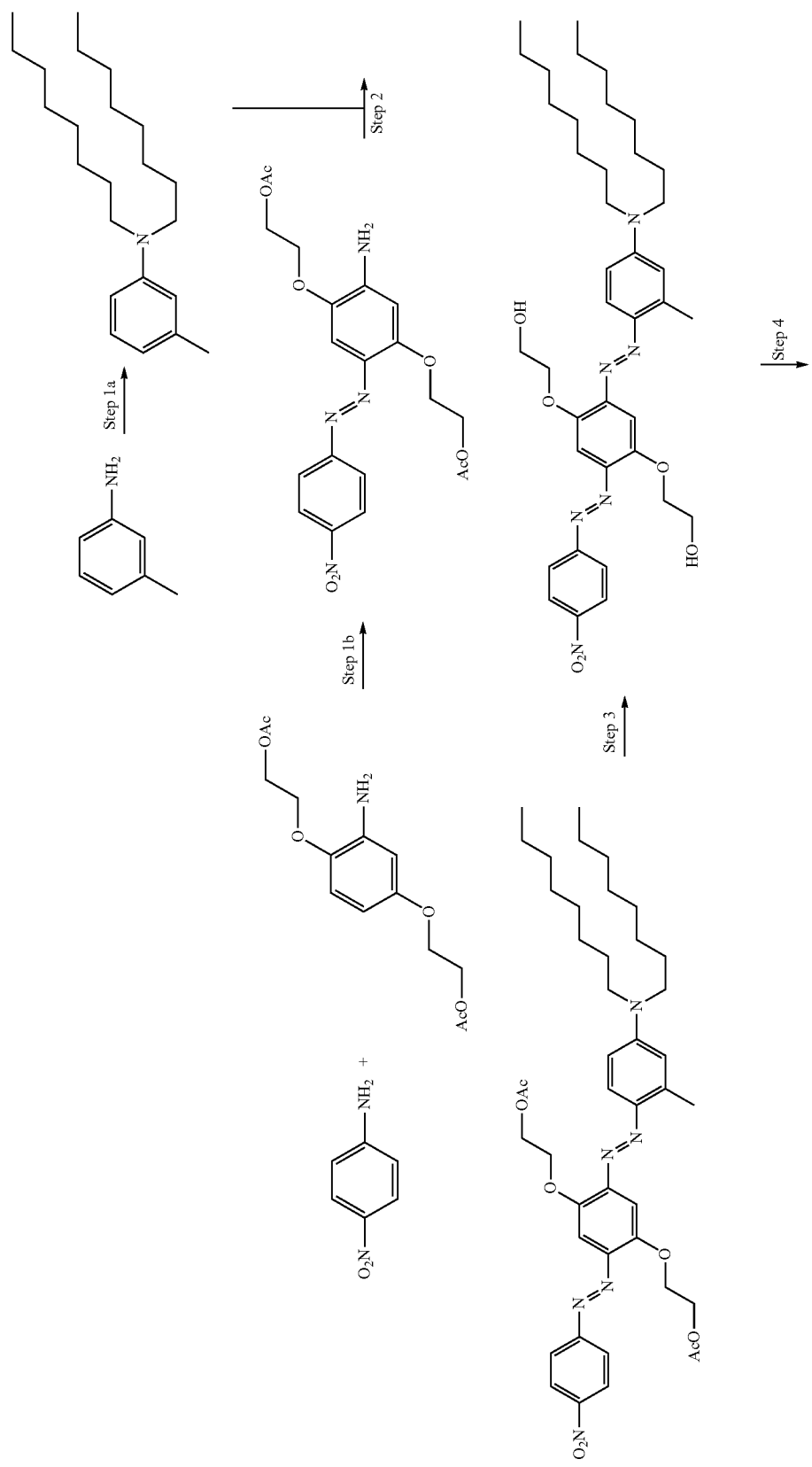

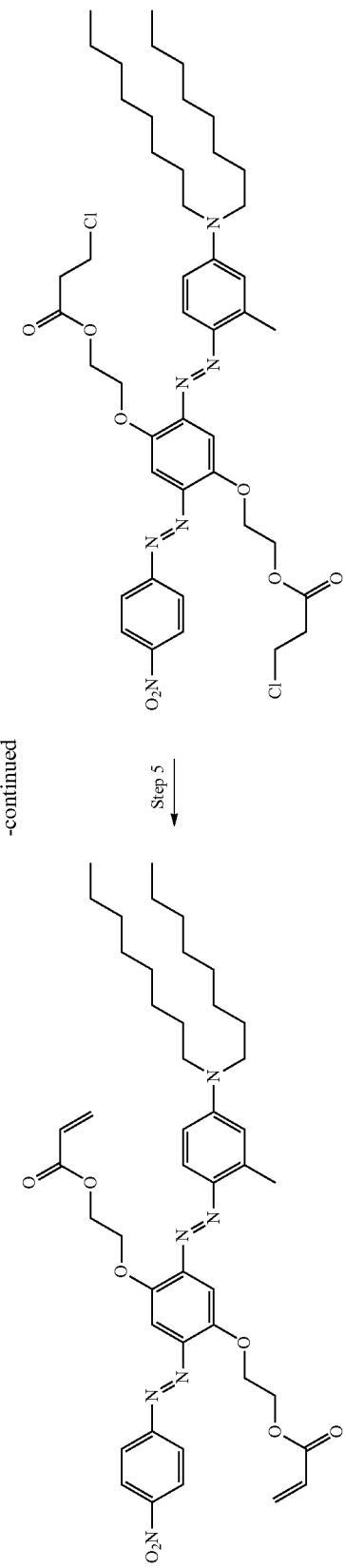
-continued
Step 5

A further essential component of the present invention is a polymerisable steric stabiliser. The polymerisable steric stabilisers need to be soluble in non-polar solvents, particularly dodecane, and have some reactive functionality such that they take part in the polymerisation. This creates a particle with a covalently bound surface of sterically stabilising compounds providing stability during and after polymerisation. The polymerisable steric stabiliser can be used in a range of molecular weights which allows strict control over the steric barrier surrounding the particles to prevent aggregation. The polymerisable group incorporates irreversibly into the particles and is therefore anchored to the surface.

A typical polymerisable steric stabiliser of the invention is a poly(dimethylsiloxane) macro-monomer (PDMS). The poly(dimethylsiloxane) may comprise one or two polymerisable groups, preferably one polymerisable group.

The following stabiliser types could be used and are commercially available from Gelest Inc.:

Methacryloyloxypropyl terminated polydimethylsiloxanes (mws 380, 900, 4500, 10000, 25000) Methacryloyloxypropyl terminated polydimethylsiloxanes (mw 600), Methacryloyloxypropyl terminated polydimethylsiloxanes (1500, 1700), (3-acryloxy-2-hydroxypropoxypropyl) terminated PDMS (mw 600), Acryloxy terminated ethyleneoxide-dimethylsiloxane-ethyleneoxide ABA block copolymers (mw 1500, 1700), methacyloyloxpropyl terminated branched polydimethylsiloxanes (683), (methacryloxypropyl)methylsiloxanes-Dimethylsiloxane copolymers (viscosity 8000, 1000, 2000), (acryloxypropyl)methylsiloxane-dimethylsiloxanes copolymers (viscosity 80, 50), (3-acryloxy-2-hydroxypropoxypropyl)methylsiloxane-dimethylsiloxane copolymers (mw 7500), mono(2,3-epoxy)propyl ether terminated polydimethylsilxoanes (mw 1000, 5000), monomethacryloxypropyl terminated polydimethylsiloxanes asymmetric (mw 600, 800, 5000, 10000), monomethacryloxypropyl functional polydimethylsiloxanes-symmetric (mw 800), monomethacryloxypropyl terminated polytrifluoropropylmethylsiloxanes-symmetric (mw 800) monovinyl terminated polydimethylsiloxanes (mw 5500, 55000, monovinyl functional polydimethylsiloxanes-symmetric (mw 1200).

Preferred polymerisable groups are methacrylate, acrylate, and vinyl groups, preferably methacrylate and acrylate groups. Most preferred are poly(dimethylsiloxane) methacrylates (PDMS-MA), especially methacryloyloxypropyl terminated PDMS-MAs as shown in Formulas 1 and 2, wherein n=5-10000. Most preferred are poly(dimethylsiloxanes) with one methacrylate group.

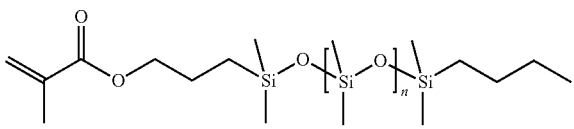

Formula 1

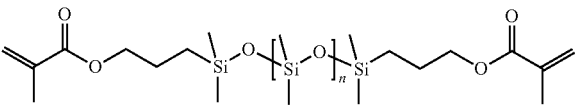

Formula 2

The polymerisable steric stabiliser of the invention preferably has a molecular weight in the range of 1000-50000, preferably 3500-35000, more preferably 5000-25000. Most preferred are methacrylate terminated polydimethylsiloxanes with a molecular weight of 10,000 or more, especially 10000-25000.

Advantageously, the polymerisable compositions of the invention comprise a combination of the above-mentioned preferred compounds of polymerisable ionic liquid, monomer, polymerisable dye, and polymerisable steric stabiliser. Most preferred are combinations of polymerisable ionic liquids of Table 1, methyl methacrylate, polymerisable dyes of Table 2, and methacrylate terminated polydimethylsiloxanes with a molecular weight of 10,000 or more.

Optionally, the polymerisable compositions of the invention comprise a chain transfer agent, e.g. catalytic chain transfer reagents, alkyl and aryl thiols, alcohols and carboxylic acids, halogenated organics and selected inorganic salts. Examples of suitable chain transfer agents are 2-propanol, adipic acid, thioglycolic acid, 2-mercaptoethanol, sodium hypochlorite, carbon tetrachloride and heavy metal poryphyrins, particularly cobalt poryphyrins preferably octane thiol.

The polymerisable composition of the invention usually comprises 0.1-15%, preferably 2.5-13%, by weight of at least one polymerisable ionic liquid, 0.1-15%, preferably 2.5-13%, by weight of at least one polymerisable dye, 0.1-50%, preferably 20-40%, by weight of at least one polymerisable steric stabiliser, 50-95%, preferably 60-90%, by weight of monomer, optionally 0-3%, by weight of chain transfer agent, and 0.1-10%, preferably 0.1-5%, by weight of initiator, all percentages are based on the total weight of the polymerisable composition (except solvent) and always add to 100 percent even if ranges of percentages could lead to higher values.

Advantageously, the polymerisable composition of the invention comprises in a non-polar hydrocarbon solvent, especially dodecane, 0.1-13%, by weight of at least one of the above-mentioned preferred polymerisable ionic liquids, 1-40%, by weight of at least one of the above-mentioned preferred polymerisable steric stabiliser, 0.1-13%, by weight of at least one of the above-mentioned preferred polymerisable dyes, 5-50%, by weight of at least one of the above-mentioned preferred monomers, 0.1-5% by weight of initiator, and optionally 0-3%, by weight of chain transfer agent, wherein most preferably polymerisable ionic liquids of Table 1, methacrylate terminated polydimethylsiloxanes with a molecular weight of 10,000 or more, polymerisable dyes of Table 2, and methyl methacrylate are used.

Polymer particles prepared according to the invention are preferably spherical particles with a size (diameter) in the range of 50-1200 nm, preferably 400-1000 nm, especially 400-700 nm, and preferably with a monodisperse size distribution. Smaller or larger particles can be further separated if required by centrifugation. Particle sizes are determined by photon correlation spectroscopy of hydrocarbon particle dispersions by a common apparatus such as a Malvern NanoZS particle analyser or preferably by SEM (Scanning Electron Microscopy) and image analysis.

A further subject of the invention is a process for the preparation of polymer particles. The polymer particles of the invention are preferably prepared using a dispersion polymerisation. This is a convenient single step method of preparing low polydispersity coloured particles. It is performed in a fluid which is a good solvent for the monomer and a non-solvent for the synthesised polymer particles. This solvent can also be used as the same solvent for EPD, e.g. dodecane. The preferred solvents are non-polar hydrocarbon solvents, especially such used in EPD fluids, i.e. the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane. Especially preferred is dodecane. The concentration of the particles in the non-polar solvent can be increased if desired by centrifugation, i.e. forced settling of the particles and pouring off excess solvent, or a stirred cell filtration system can be used. The dispersion can be washed with a non-polar solvent if required. If necessary, the coloured polymer particles are simply separated from the reaction suspension by filtration, preferably by pouring the suspension through a pore size filter, i.e. a 0.1 µm pore size filter, or the particles can be cleaned by centrifuging.

The selection of the polymerisation conditions depends on the required size and size distribution of the particles. Adjustment of polymerisation conditions is well known to someone skilled in the art.

Preferably, a batch polymerisation process is used wherein all reactants are completely added at the outset of the polymerisation process. In such process only relatively few variables have to be adjusted for a given formulation. Preferred changes which can be made in such cases are to the reaction temperature, reactor design and the type and speed of stirring. Thus, a batch polymerisation process is used for manufacture versus a semi-continuous batch process because of limited versatility and simple evaluations of reaction formulation.

A further advantage of the process according to the invention is that it is surfactant-free. Protective colloids (soluble polymers) and surfactants are usually key formulation variables in heterogeneous polymerisations because of their impact on the intraparticle stability and particle size control but they may have a detrimental effect on the electrophoretic response.

Preferably the polymerisation according to the invention is a free radical polymerisation. Initiators can be for example 2,2'-azobis(isobutyronitrile) (AIBN) (Wako Chemicals), 2,2'-azobis(2-methylbutyronitrile) (Vazo 67) (Wako Chemicals) and benzoyl peroxide.

Typical process conditions are described for the preparation of dyed pMMA particles incorporating polymerisable ionic liquid. Methyl methacrylate, ionic liquid, dye monomer and a PDMS-methacrylate are added to a non-polar hydrocarbon solvent, preferably dodecane. The reaction mixture is stirred under nitrogen at 300 rpm, then heated to 60-90, preferably 75° C. An initiator, preferably Vazo 59 or azobisisobutyronitrile is added to initiate polymerisation. The reaction is allowed to proceed for approximately 2 hours after which time the reaction is allowed to cool to room temperature. The particles are filtered through a 50 micron cloth and are cleaned by centrifugation and redispersion in dodecane if required.

The concentration of the final particles in the non-polar solvent can be increased if desired by centrifugation, i.e. forced settling of the particles and pouring off excess solvent, or a stirred cell filtration system can be used. The dispersion can be washed with a non-polar solvent if required. If necessary, the particles are simply separated from the reaction suspension by filtration, preferably by pouring the suspension through a pore size filter, i.e. a 0.1 µm pore size filter, or the particles can be cleaned by centrifuging.

Particles of the invention are primarily designed for use in electrophoretic displays, especially for use in mono, bi or polychromal electrophoretic devices. A typical electrophoretic display comprises an electrophoretic fluid comprising the particles dispersed in a low polar or non-polar solvent along with additives to improve electrophoretic properties, such as stability and charge. Examples of such electrophoretic fluids are well described in the literature, for example U.S. Pat. No. 7,247,379; WO 99/10767; US 2007/0128352; U.S. Pat. Nos. 7,236,290; 7,170,670; 7,038,655; 7,277,218; 7,226,550; 7,110,162; 6,956,690; 7,052,766; 6,194,488; 5,783,614; 5,403,518; 5,380,362.

The particles of the invention, especially the presented white reflective particles may be used in combination with a dyed fluid, with additional particles such as oppositely charged black particles, with oppositely charged coloured particles or with equally charged coloured particles and oppositely charged black particles for example. The particles of the invention, especially the present white reflective particles may be used for example in combination with coloured or black polymer particles.

Preferably these additional black or coloured polymer particles comprise a polymerised or co-polymerised dye. Especially coloured copolymers particles comprising monomer units of at least one monomer, of at least one polymerisable dye, optionally of at least one charged co-monomer, and optionally of at least one crosslinking co-monomer are preferred. The polymerisable dye comprises preferably a chromophore, preferably an azo group, anthraquinone group or phthalocyanine group, one or more polymerisable groups, and optional linker groups. To enhance the surface stabilisation or steric repulsions of the coloured polymeric particles in a non-polar continuous phase, a steric stabiliser is preferably incorporated into the coloured polymer particles. Especially, the polymer particles described in WO 2009/100803, WO 2010/089057, WO 2010/089058, WO 2010/089059, WO 2010/089060, WO 2011/154103 and/or WO 2012/019704 are suitable for incorporation in the CSD polymers of the invention. Preferably, polymer particles described in WO 2010/089057 and/or WO 2012/019704 may be used.

Typical additives to improve the stability of the fluid (either by steric stabilisation or by use as a charging agent) are known to experts in the field and include (but are not limited to) the Brij, Span and Tween series of surfactants (Aldrich), Infineum surfactants (Infineum), the Solsperse, Ircosperse and Colorburst series (Lubrizol), the OLOA charging agents (Chevron Chemicals) and Aerosol-OT (Aldrich). Typical surfactants used in this process are cationic, anionic, zwitterionic or non-ionic with a hydrophilic portion usually termed the head group which is mono-, di- or polysubstituted with a hydrophobic portion usually termed the tail. The hydrophilic head group of the surfactant in this process can be, but is not limited to being, made up of derivatives of sulfonates, sulfates, carboxylates, phosphates, ammoniums, quaternary ammoniums, betaines, sulfobetaines, imides, anhydrides, polyoxyethylene (e.g. PEO/PEG/PPG), polyols (e.g. sucrose, sorbitan, glycerol etc), polypeptides and polyglycidyls. The hydrophobic tail of the surfactant in this process can be, but is not limited to being, made up of straight and branched chain alkyls, olefins and polyolefins, rosin derivatives, PPO, hydroxyl and polyhydroxystearic acid type chains, perfluoroalkyls, aryls and mixed alkyl-aryls, silicones, lignin derivatives, and partially unsaturated versions of those mentioned above. Surfactants for this process can also be catanionic, bolaforms, gemini, polymeric and polymerisable type surfactants.

Any other additives to improve the electrophoretic properties can be incorporated provided they are soluble in the formulation medium, in particular thickening agents or polymer additives designed to minimise settling effects.

The dispersion solvent can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5 cst), low water solubility, a high boiling point (>80° C.) and a refractive index and density similar to that of the particles. Adjustment of these variables can be useful in order to change the behavior of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trot (Shell), naphtha, and other petroleum solvents, as well as long chain alkanes such as dodecane, tetradecane, decane and nonane). These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The preferred additives and solvents used in the formulation of the particles of the invention are Aerosol OT (Aldrich), Span 85 (Aldrich), and dodecane (Sigma Aldrich).

The solvents and additives used to disperse the particles are not limited to those used within the examples of this invention and many other solvents and/or dispersants can be used. Lists of suitable solvents and dispersants for electrophoretic displays can be found in existing literature, in particular WO 99/10767 and WO 2005/017046. The Electrophoretic fluid is then incorporated into an Electrophoretic display element by a variety of pixel architectures, such as can be found in C. M. Lampert, Displays; 2004, 25(5) published by Elsevier B.V., Amsterdam.

The Electrophoretic fluid may be applied by several techniques such as inkjet printing, slot die spraying, nozzle spraying, and flexographic printing, or any other contact or contactless printing or deposition technique.

Electrophoretic displays comprise typically, the electrophoretic display media in close combination with a monolithic or patterned backplane electrode structure, suitable for switching the pixels or patterned elements between the black and white optical states or their intermediate greyscale states.

The coloured and white reflective polymer particles according to the present invention are suitable for all known electrophoretic media and electrophoretic displays, e.g. flexible displays, TIR-EPD (total internal reflection electrophoretic devices), one particle systems, two particle systems, dyed fluids, systems comprising microcapsules, microcup systems, air gap systems and others as described in C. M. Lampert, Displays; 2004, 25(5) published by Elsevier B.V., Amsterdam. Examples of flexible displays are dynamic keypads, e-paper watches, dynamic pricing and advertising, e-readers, rollable displays, smart card media, product packaging, mobile phones, lab tops, display card, digital signage.

Particles of the invention may also be used in optical, electrooptical, electronic, electrochemical, electrophotographic, electrowetting displays and/or devices, e.g. TIR (total internal reflection electronic devices), and in security, cosmetic, decorative, and diagnostic applications. The use in electrowetting displays is preferred. Electrowetting (EW) is a physical process where the wetting properties of a liquid droplet are modified by the presence of an electric field. This effect can be used to manipulate the position of a coloured fluid within a pixel. For example, a nonpolar (hydrophobic) solvent containing colourant can be mixed with a clear colourless polar solvent (hydrophilic), and when the resultant biphasic mixture is placed on a suitable electrowetting surface, for example a highly hydrophobic dielectric layer, an optical effect can be achieved. When the sample is at rest, the coloured non-polar phase will wet the hydrophobic surface, and spread across the pixel. To the observer, the pixel would appear coloured. When a voltage is applied, the hydrophobicity of the surface alters, and the surface interactions between the polar phase and the dielectric layer are no longer unfavourable. The polar phase wets the surface, and the coloured non-polar phase is thus driven to a contracted state, for example in one corner of the pixel. To the observer, the pixel would now appear transparent. A typical electrowetting display device consists of the particles in a low polar or non-polar solvent along with additives to improve properties, such as stability and charge. Examples of such electrowetting fluids are described in the literature, for example in WO2011/017446, WO 2010/104606, and WO2011075720.

The disclosures in the cited references are expressly also part of the disclosure content of the present patent application. In the claims and the description, the words "comprise/comprises/comprising" and "contain/contains/containing" mean that the listed components are included but that other components are not excluded. The following examples explain the present invention in greater detail without restricting the scope of protection. In the foregoing and in the following examples, unless otherwise indicated all parts and percentages are by weight.

EXAMPLES

PDMS monomers are purchased from Fluorochem, UK. Reagents and dodecane are purchased from Sigma-Aldrich Company and used without further purification. AIBN initiator is purchased from VWR. V59 initiator is purchased from Wako. Polymerisable ionic liquids are prepared before use from the corresponding bromide salt.

Magenta dye (Dye 1) dye synthesis is previously disclosed in WO 2012/019704/example 11.

Yellow dye (Dye 2) synthesis is previously disclosed in WO 2012/019704/example 24.

Black dye (Dye 3) synthesis is previously disclosed in WO 2013/079146019704/example 3.

Particle size is measured by SEM and image analysis. One drop of a particle dispersion is added to 2.5 ml heptane. One drop of this solution is deposited onto a silica wafer attached to the SEM stub. Samples are sputtered by gold for 120 seconds at 18 mA before being assessed in the SEM chamber.

The electrophoretic fluids are prepared by vortex mixing 3 wt % of particles, 3 wt % of AOT (sodium bis(2- ethylhexyl)sulfosuccinate); 5 wt % in dodecane, and 94 wt % of dodecane. The dispersion is then roller mixed for 30 minutes.

The Zeta potentials of the formulations are performed using a Malvern NanoZS particle analyser unless otherwise stated. This instrument measures the size of particles in dispersion and the zeta potential of an electrophoretic fluid. The Zeta potential (ZP) is derived from the real-time measurement of the electrophoretic mobility and thus is an indicator of the suitability of the fluid for use in electrophoretic applications.

Samples for analysis are prepared from PIL containing particle dispersions with known particle weight content. When using additives, surfactants are added at a concentration so that the ratio of particles to surfactant is 1:1 by weight.

Preparation of Bromide Salts
(Used for the Preparation of all Imidazolium and Pyrrolidinium Based Ionic Liquids)

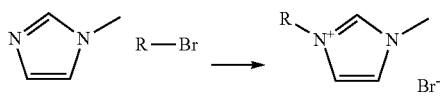

Methyl imidazole (1 eq) and a bromoalkane (1.1 eq) are weighed into a round bottomed flask and acetonitrile is added. The flask is equipped with a magnetic stirrer bar, and a condenser. The mixture is stirred at 65° C. until consumption of methyl imidazole is evident by NMR analysis. The reaction mixture is then cooled and the mixture concentrated in vacuo. The resulting material is recrystallised using ethyl acetate.

Anion Exchange
(Used for the Preparation of all SPMA Ionic Liquids)

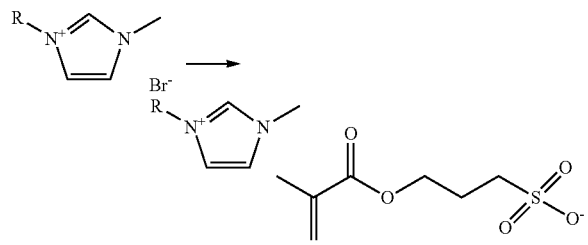

Amberlite IRA-400 (Cl) resin (100 ml) is loaded into a column and flushed with water until the solvent runs clear. A bromide salt (10 g) is dissolved in acetonitrile (100 ml) and is passed slowly through the resin. The resin is washed with further acetonitrile. The solvent is then concentrated in vacuo. The resulting chloride salt is then re-dissolved in acetonitrile (20 ml). In a separate flask the 3-sulfopropylmethyacylate potassium salt (1.1 eq) is dissolved in acetonitrile. This solution is added drop wise to the stirring chloride salt, once addition is complete allowed to stir at room temperature overnight. The resulting suspension is then filtered and concentrated in vacuo. The residue is re-dissolved in DCM, re-filtered and concentrated to yield the product ionic liquid.

Example 1: Synthesis of Undyed pMMA Particles with Positive Zeta Potential with AOT Surfactant in Dodecane (Larger Particles)

Methyl methacrylate (20.58 g), N6666 SPMA (1.03 g) and PDMS-MA (10000 mw) stabiliser (1.05 g) are weighed out into a 100 ml 3-necked flask equipped with a condenser, nitrogen flow and an overhead stirrer.

Dodecane (25.20 g) is added to the reaction flask. The mixture is heated with stirring at 300 rpm, and once the temperature in the flask is at 75° C., Vazo-59 (0.2 g) is added and the reaction stirred for 2 hours.

The resulting solution is filtered through a 50 micron cloth to remove small lumps. The particles are cleaned using a centrifuge. Centrifugations are carried out at 10000 rpm for 20 minutes each, replacing the supernatant with dodecane three times. Average particle size is measured by SEM and image analysis: 1595 nm.

Examples

| Example | PIL | % PIL | Size/nm | zP in AOT/mV |
| --- | --- | --- | --- | --- |
| 1 | N6666 SPMA | 5 | 1595 | +44 |
| 2 | C8mim SPMA | 5 | 1216 | +2.5 |

Example 3: Synthesis of Undyed pMMA Particles with Positive Zeta Potential with AOT Surfactant in Dodecane (Smaller Particles)

Methyl methacrylate (5.08 g), N6666 SPMA (0.27 g) and PDMS-MA (10000 mw) stabiliser (1.7 g) are weighed out into a 100 ml 3-necked flask equipped with a condenser, nitrogen flow and an overhead stirrer.

Dodecane (42.00 g) is added to the reaction flask. The mixture is heated with stirring at 300 rpm, and once the temperature in the flask is at 75° C., Vazo-59 (0.2 g) is added and the reaction stirred for 2 hours.

The resulting solution is filtered through a 50 micron cloth to remove small lumps. The particles are cleaned using a centrifuge. Centrifugations are carried out at 10000 rpm for 20 minutes each, replacing the supernatant with dodecane three times. Average particle size is measured by SEM and image analysis: 358 nm.

Examples

| Example | PIL | % PIL | Size/nm | zP in AOT/mV |
| --- | --- | --- | --- | --- |
| 3 | N6666 SPMA | 5 | 358 | +148 |
| 4 | C8mim SPMA | 10 | 357 | +78 |
| 5 | N6666 SPMA | 10 | 330 | +110 |
| 6 | C12mpyrr SPMA | 5 | 289 | +81 |
| 7 | P66614 SPMA | 5 | 590 | +112 |
| 8 | P66614 SPMA | 10 | 598 | +93 |
| 9 | P66614 SPMA | 15 | 353 | +83 |
| 10 | P66614 SPMA | 1 | 258 | +91 |
| 11 | P66614 SPMA | 2.5 | 347 | +111 |
| 12 | N6666 SPMA | 15 | 676 | +118 |

-continued

| Example | PIL | % PIL | Size/nm | zP in AOT/mV |
|---|---|---|---|---|
| 13 | P4444 SPMA | 1 | 277 | +115 |
| 14 | P4444 SPMA | 2.5 | 277 | +80 |
| 15 | P4444 SPMA | 5 | 228 | +76 |

Example 16: Synthesis of Black pMMA Particles with Positive Zeta Potential with AOT Surfactant in Dodecane (Smaller Particles)

Methyl methacrylate (5.08 g), N6666 SPMA (0.54 g), black dye (Dye 3; 0.23 g), yellow dye (Dye 2; 0.04 g) and PDMS-MA (10000 mw) stabiliser (1.7 g) are weighed out into a 100 ml 3-necked flask equipped with a condenser, nitrogen flow and an overhead stirrer. Stirring is initiated to facilitate dissolution of the dye. Dodecane (42.00 g) is added to the reaction flask.

The mixture is heated with stirring at 300 rpm, and once the temperature in the flask is at 75° C., Vazo-59 (0.43 g) is added and the reaction stirred for 2 hours.

The resulting solution is filtered through a 50 micron cloth to remove small lumps. The particles are cleaned using a centrifuge. Centrifugations are carried out at 10000 rpm for 20 minutes each, replacing the supernatant with dodecane until the supernatant is colourless. Average particle size is measured by SEM and image analysis: 539 nm.

Examples

| Example | % N6666 SPMA | % Black Dye | Size/nm | zP in AOT/mV |
|---|---|---|---|---|
| 16 | 10 | 5 | 539 | +172 |
| 17 | 1 | 5 | 450 | +105 |
| 18 | 5 | 5 | 436 | +184 |
| 19 | 2.5 | 5 | 272 | +154 |
| 20 | 5 | 10 | 801 | +114 |

Example 21: Synthesis of Magenta pMMA Particles with Positive Zeta Potential with AOT Surfactant in Dodecane Methyl methacrylate (5.08 g), N6666 SPMA (0.27 g), magenta dye (Dye 1; 0.27 g) and PDMS-MA (10000 mw) stabiliser (1.7 g) are weighed out into a 100 ml 3-necked flask equipped with a condenser, nitrogen flow and an overhead stirrer. Stirring is initiated to facilitate dissolution of the dye.

Dodecane (42.00 g) is added to the reaction flask. The mixture is heated with stirring at 300 rpm, and once the temperature in the flask is at 75° C., Vazo-59 (0.43 g) is added and the reaction stirred for 2 hours.

The resulting solution is filtered through a 50 micron cloth to remove small lumps. The particles are cleaned using a centrifuge. Centrifugations are carried out at 10000 rpm for 20 minutes each, replacing the supernatant with dodecane until the supernatant is colourless. Average particle size is measured by SEM and image analysis: 691 nm.

| Example | % N6666 SPMA | % Magenta Dye | Size/nm | zP in AOT/mV |
|---|---|---|---|---|
| 21 | 5 | 5 | 691 | +154 |

Example 22: Synthesis of Yellow pMMA Particles with Positive Zeta Potential with AOT Surfactant in Dodecane Methyl methacrylate (5.08 g), N6666 SPMA (0.27 g), yellow dye (Dye 2; 0.27 g) and PDMS-MA (10000 mw) stabiliser (1.7 g) are weighed out into a 100 ml 3-necked flask equipped with a condenser, nitrogen flow and an overhead stirrer. Stirring is initiated to facilitate dissolution of the dye.

Dodecane (42.00 g) is added to the reaction flask. The mixture is heated with stirring at 300 rpm, and once the temperature in the flask is at 75° C., Vazo-59 (0.43 g) is added and the reaction stirred for 2 hours.

The resulting solution is filtered through a 50 micron cloth to remove small lumps. The particles are cleaned using a centrifuge. Centrifugations are carried out at 10000 rpm for 20 minutes each, replacing the supernatant with dodecane until the supernatant is colourless. Average particle size is measured by SEM and image analysis: 680 nm.

| Example | % N6666 SPMA | % Yellow Dye | Size/nm | zP in AOT/mV |
|---|---|---|---|---|
| 22 | 5 | 5 | 680 | +83 |

The invention claimed is:
1. Polymer particles for use in electrophoretic devices comprising monomer units of
   a) at least one ethylenically unsaturated monomer;
   b) at least one polymerisable ionic liquid (PIL) selected from A to S listed below:

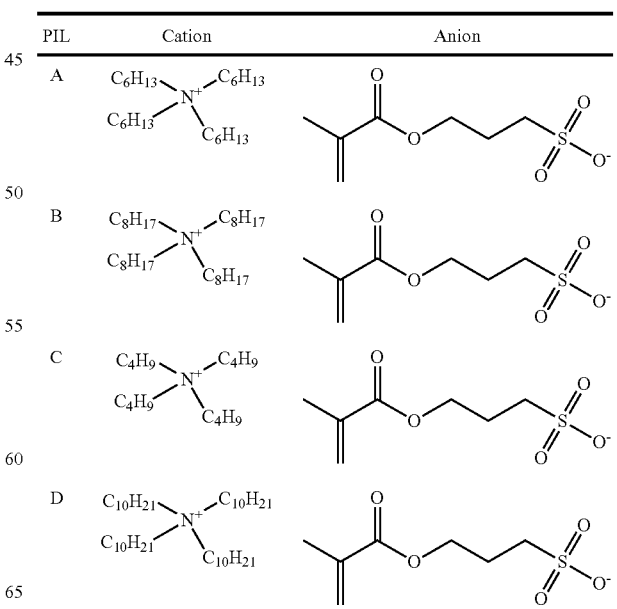

c) optionally at least one polymerisable dye, and
d) optionally at least one polymerisable steric stabilizer and
wherein the particles are spherical and have a diameter particle size in the range of 50-1200 nm.
2. Polymer particles according to claim 1, wherein the polymerisable dye is present and is a dye of the formula (I')-(VI'), or (VII)
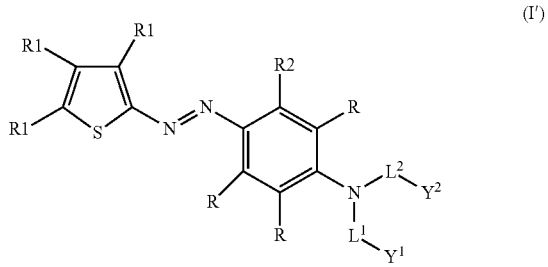
(I')
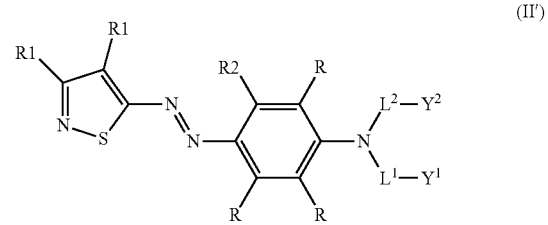
(II')
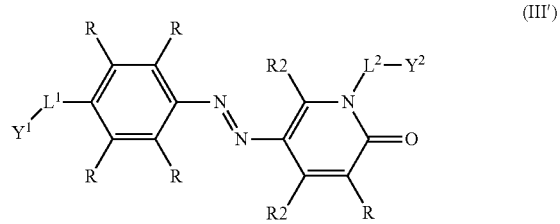
(III')

-continued

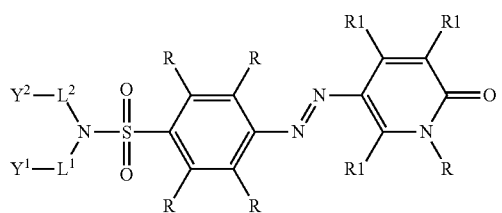
(IV')

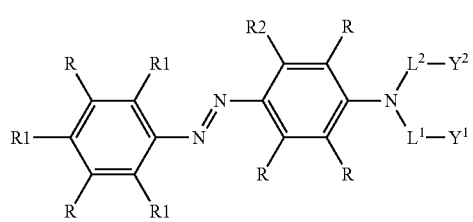
(V')

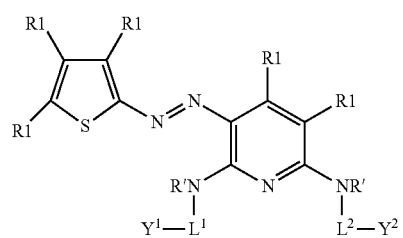
(VI')

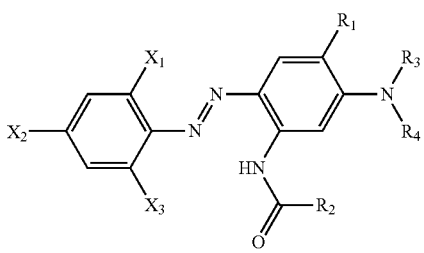
Formula (VII)

wherein
R is H;
R1 and R2 are independently of one another alkyl, —OR', —SR', —C(O)R', —C(O)OR', —NHCOR', —NO$_2$, —CN, with R' equal to H or alkyl;
$L^1$ and $L^2$ are independently of one another a single bond, C1-C6 alkyl, a polyether alkyl chain, or a combination thereof; and
$Y^1$ and $Y^2$ are methyl acrylate or methylmethacrylate;
$X_1$, $X_2$, and $X_3$ are independently of one another H or an electron-withdrawing group;
$R_1$ is H or OR' with R'=a linear, branched or cyclic alkyl group;
$R_2$ is a linear, branched or cyclic alkyl group;
$R_3$ and $R_4$ are independently of one another groups of the structure $L_3$-$Y_3$, $L_4$-$Y_4$;
$L_3$, and $L_4$ are linker groups and independently of one another linear or branched, substituted or unsubstituted alkylene groups where one or more non-adjacent carbon atoms is optionally replaced by O, S and/or N;
$Y_3$, and $Y_4$ are independently of one another polymerisable groups;
wherein at least one of $R_3$ and $R_4$ comprises a polymerisable group and at least one of $X_1$, $X_2$, and $X_3$ is an electron-withdrawing group.

3. Polymer particles according to claim 2, wherein
wherein R is H;
R1 and R2 are independently of one another —CH$_3$, —NO$_2$, —OH, —CN, —COCH$_3$, —CO$_2$CH$_2$CH$_3$, —NHCOR';
$L^1$ and $L^2$ are, identical, C2-C4 alkyl, and
$Y^1$ and $Y^2$ are, identical, methyl acrylate or methyl methacrylate,
$X_1$, $X_2$, and $X_3$ are independently of one another, an electron-withdrawing group selected from the group consisting of
NO$_2$, CN, halogen, acyl, trifluoromethoxy, trifluoromethyl, SO$_2$F, and CO$_2$R, SO$_2$R, SO$_2$NRR and SO$_2$NHR, with R being independently linear or branched C1-C4 alkyl, with at least one of $X_1$, $X_2$, and $X_3$ is NO$_2$, CN, Br, Cl, SO$_2$NRR or SO$_2$NHR and $Y_3$ and $Y_4$ are identical and are methacrylate or acrylate.

4. Polymer particles according to claim 1, wherein the polymerisable dye is present and is a dye of the Dye 1 to Dye 19:

Dye 1

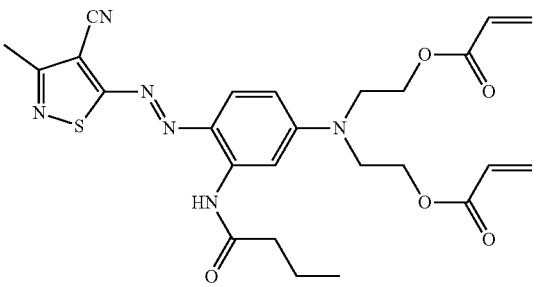 [SMILES: C=CC(=O)OCCN(CCOC(=O)C=C)c1ccc(/N=N/c2snc(C)c2C#N)c(NC(=O)CCC)c1]

Dye 2

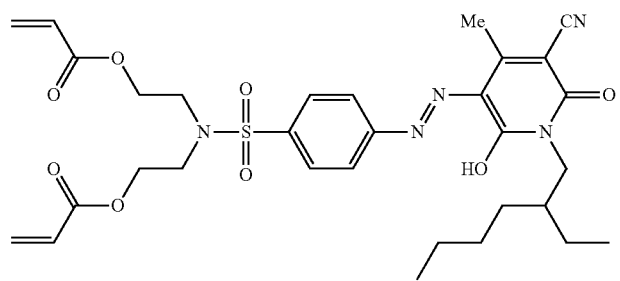 [SMILES: C=CC(=O)OCCN(CCOC(=O)C=C)S(=O)(=O)c1ccc(/N=N/c2c(C)c(C#N)c(=O)n(CC(CC)CCCC)c2O)cc1]

Dye 3
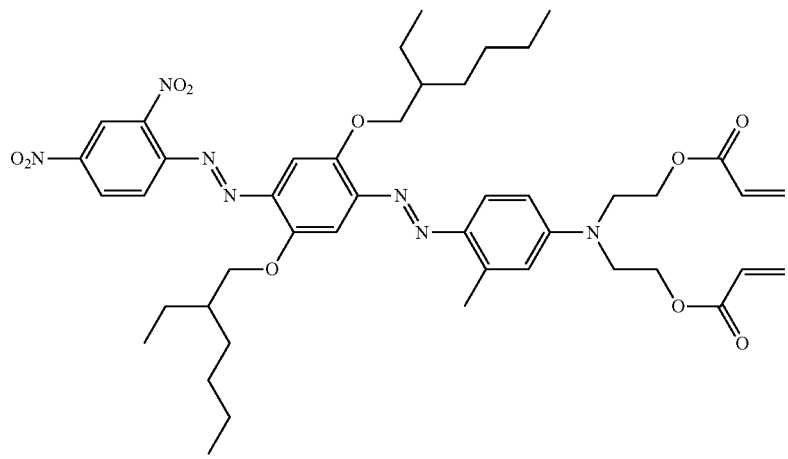 [SMILES: C=CC(=O)OCCN(CCOC(=O)C=C)c1ccc(/N=N/c2cc(OCC(CC)CCCC)c(/N=N/c3ccc([N+](=O)[O-])cc3[N+](=O)[O-])cc2OCC(CC)CCCC)c(C)c1]
Dye 4
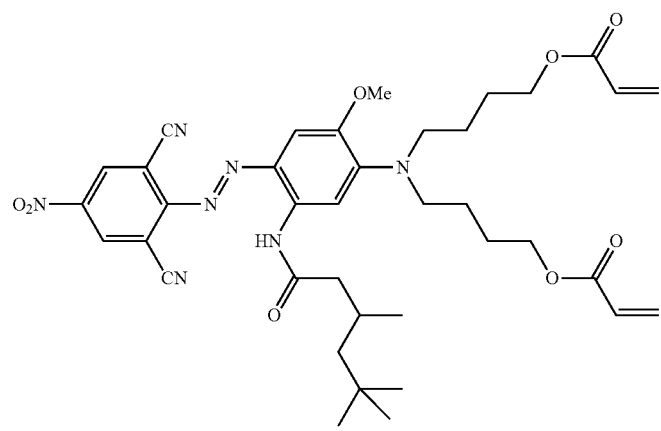 [SMILES: C=CC(=O)OCCCCN(CCCCOC(=O)C=C)c1cc(NC(=O)CC(C)CC(C)(C)C)c(/N=N/c2c(C#N)cc([N+](=O)[O-])cc2C#N)cc1OC]
Dye 5
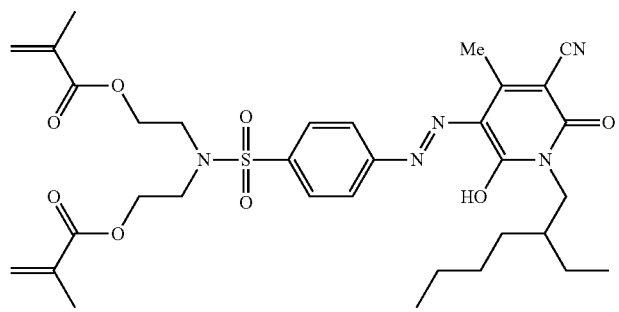 [SMILES: C=C(C)C(=O)OCCN(CCOC(=O)C(=C)C)S(=O)(=O)c1ccc(/N=N/c2c(C)c(C#N)c(=O)n(CC(CC)CCCC)c2O)cc1]
Dye 6
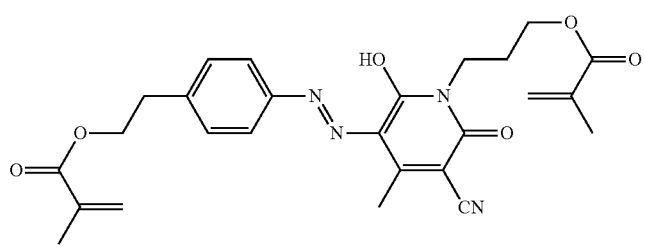 [SMILES: C=C(C)C(=O)OCCCn1c(O)c(/N=N/c2ccc(CCOC(=O)C(=C)C)cc2)c(C)c(C#N)c1=O]

-continued
Dye 7
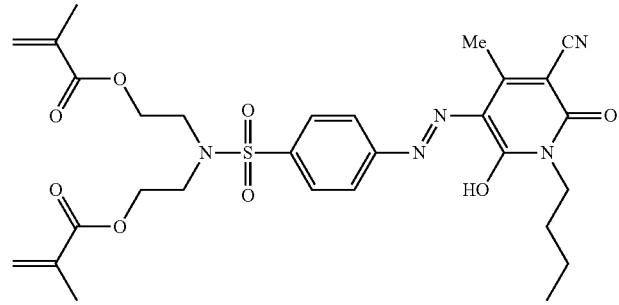 [SMILES: C=C(C)C(=O)OCCN(CCOC(=O)C(=C)C)S(=O)(=O)c1ccc(/N=N/c2c(C)c(C#N)c(=O)n(CCCC)c2O)cc1]
Dye 8
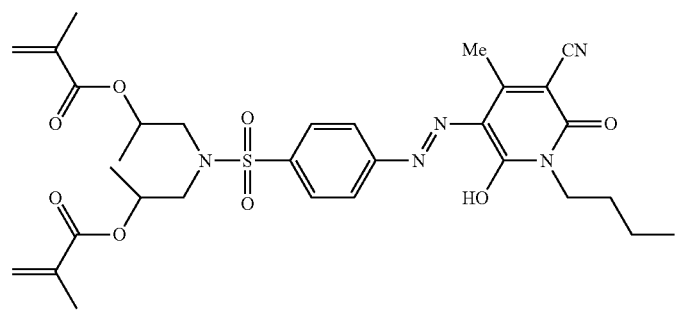 [SMILES: C=C(C)C(=O)OC(C)CN(CC(C)OC(=O)C(=C)C)S(=O)(=O)c1ccc(/N=N/c2c(C)c(C#N)c(=O)n(CCCC)c2O)cc1]
Dye 9
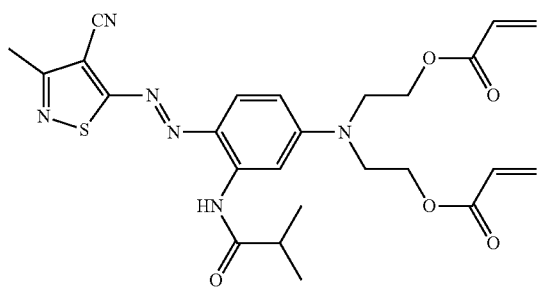 [SMILES: C=CC(=O)OCCN(CCOC(=O)C=C)c1ccc(/N=N/c2snc(C)c2C#N)c(NC(=O)C(C)C)c1]
Dye 10
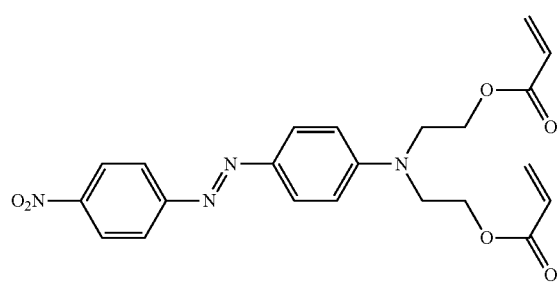 [SMILES: C=CC(=O)OCCN(CCOC(=O)C=C)c1ccc(/N=N/c2ccc([N+](=O)[O-])cc2)cc1]
Dye 11
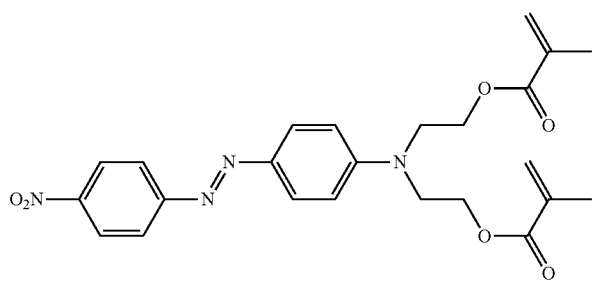 [SMILES: C=C(C)C(=O)OCCN(CCOC(=O)C(=C)C)c1ccc(/N=N/c2ccc([N+](=O)[O-])cc2)cc1]

Dye 12
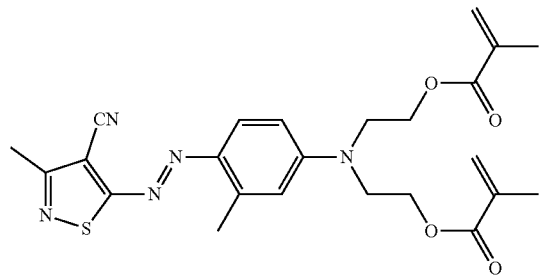 [SMILES: C=C(C)C(=O)OCCN(CCOC(=O)C(=C)C)c1ccc(/N=N/c2snc(C)c2C#N)c(C)c1]
Dye 13
$CuPc \underset{[3-SO_2-N(n-C_6H_{13})_2]_2}{\overset{[3-SO_2-N(n-C_4H_9)C_2H_4O-CO-C(CH_3)=CH_2]_2}{\diagup}}$
Dye 14
$CuPc \underset{[3-SO_2-N(n-C_8H_{17})_2]_2}{\overset{[3-SO_2-N(n-C_4H_9)C_2H_4O-CO-C(CH_3)=CH_2]_2}{\diagup}}$
Dye 15
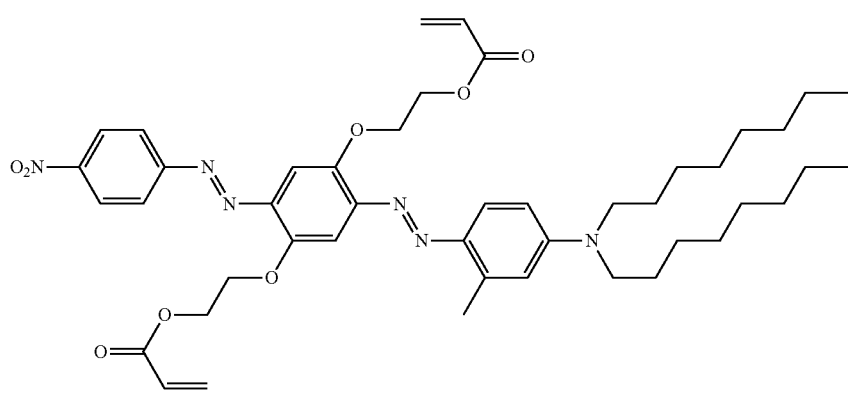 [SMILES: C=CC(=O)OCCOc1cc(/N=N/c2ccc(N(CCCCCCCC)CCCCCCCC)cc2C)c(OCCOC(=O)C=C)cc1/N=N/c1ccc([N+](=O)[O-])cc1]
Dye 16
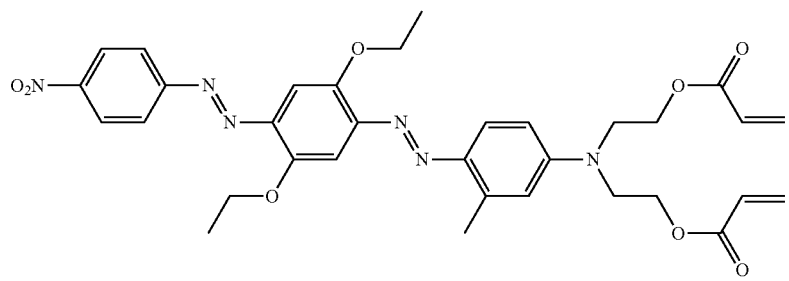 [SMILES: C=CC(=O)OCCN(CCOC(=O)C=C)c1ccc(/N=N/c2cc(OCC)c(/N=N/c3ccc([N+](=O)[O-])cc3)cc2OCC)c(C)c1]
Dye 17
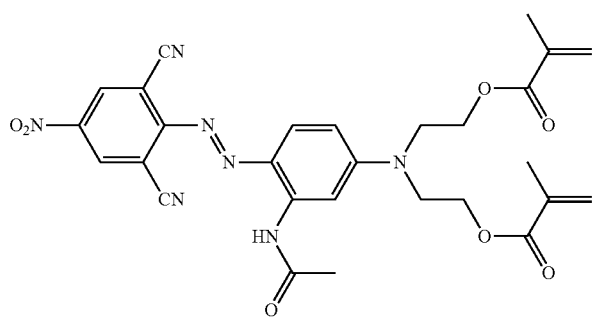 [SMILES: C=C(C)C(=O)OCCN(CCOC(=O)C(=C)C)c1ccc(/N=N/c2c(C#N)cc([N+](=O)[O-])cc2C#N)c(NC(C)=O)c1]

Dye 18

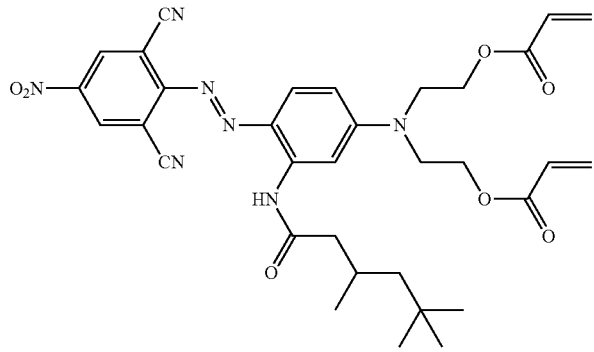 [SMILES: C=CC(=O)OCCN(CCOC(=O)C=C)c1ccc(/N=N/c2c(C#N)cc([N+](=O)[O-])cc2C#N)c(NC(=O)CC(C)CC(C)(C)C)c1]

Dye 19

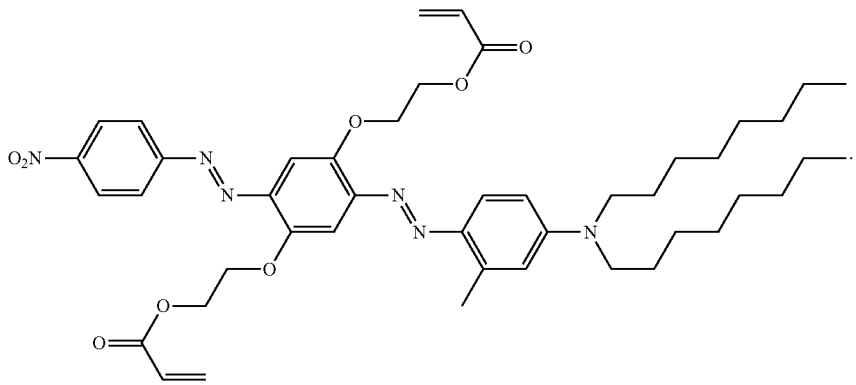 [SMILES: C=CC(=O)OCCOc1cc(/N=N/c2ccc(N(CCCCCCCC)CCCCCCCC)cc2C)c(OCCOC(=O)C=C)cc1/N=N/c1ccc([N+](=O)[O-])cc1]

5. Polymer particles according to claim 1, wherein the at least one polymerisable dye is present and the polymerisable dye is selected from the group consisting of monoazo dyes, disazo dyes, metallised dyes, anthraquinone dyes, phthalocyanine dyes, benzodifuranones dyes, Brilliant Blue derivatives, pyrroline dyes, squarilium dyes, triphendioxazine dyes and mixtures of these dyes.

6. Polymer particles according to claim 1, wherein said at least one polymerisable ionic liquid is selected from the A, B, C, D, E, F, G, H, I, J, K, O, P, Q, or R.

7. Polymer particles according to claim 1, wherein said at least one polymerisable dye is present, and said at least one polymerisable steric stabilizer is present.

8. Polymer particles according to claim 1, wherein the polymerisable dye is present and is a dye of the formula (VIII)

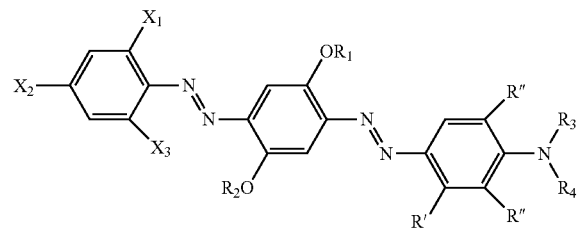

Formula (VIII)

wherein
$X_1$, $X_2$, and $X_3$ are independently of one another H or an electron-withdrawing group;
$R_1$ and $R_2$ are independently of one another groups of the structure $L_1$-$Y_1$, $L_2$-$Y_2$ or linear, branched or cyclic alkyl groups;
$R_3$ and $R_4$ are independently of one another groups of the structure $L_3$-$Y_3$, $L_4$-$Y_4$ or linear, branched or cyclic, substituted or unsubstituted alkyl groups where one or more non-adjacent carbon atoms may be replaced by O, S and/or N;
$L_1$, $L_2$, $L_3$, and $L_4$ are linker groups and independently of one another linear or branched, substituted or unsubstituted alkylene groups where one or more non-adjacent carbon atoms may be replaced by O, S and/or N;
$Y_1$, $Y_2$, $Y_3$, and $Y_4$ are independently of one another polymerisable groups;
$R'$ is a linear or branched alkyl group, $OR_5$, H, $NHCOR_6$ or $NHSO_2R_7$;
$R''$ is $OR_5$, H or $NHCOR_6$,
$R_5$, $R_6$, and $R_7$ are independently of one another linear or branched alkyl groups; and
wherein at least one of $R_1$, $R_2$, $R_3$ and $R_4$ is a polymerisable group and at least one of $X_1$, $X_2$, and $X_3$ is an electron-withdrawing group.

9. Polymer particles according to claim 1, wherein the ethyleneically unsaturated monomer is methacrylates and/or acrylates.

10. Polymer particles according to claim 1, wherein the at least one polymerisable dye is present and the polymerisable dye is selected from azo dyes.

11. Polymer particles according to claim 1, wherein the at least one polymerisable steric stabilizer is present and the polymerisable steric stabilizer is a poly(dimethylsiloxane) macromonomer with at least one polymerisable group and a molecular weight in the range of 1000-50000.

12. Polymer particles according to claim 1, wherein the at least one polymerisable steric stabilizer is present and the polymerisable steric stabilizer is a mono-methacrylate terminated poly-dimethylsiloxane.

13. Polymer particles according to claim 1, wherein the particles are spherical and have a diameter particle size in the range of 400-1000 nm.

14. Polymer particles according to claim 1, wherein the particles are spherical and have a diameter particle size in the range 400-700 nm.

15. Polymer particles according to claim 10, wherein the particles are spherical and have a diameter particle size in the range 400-700 nm, and with a monodisperse size distribution.

16. A process for the preparation of polymer particles according claim 1, comprising
   a) polymerizing said at least one ethylenically unsaturated monomer, said at least one polymerisable ionic liquid, at least one initiator, said at least one polymerisable dye, and said at least one polymerisable steric stabiliser by dispersion or emulsion polymerisation in a non-aqueous, non-polar solvent, and
   b) optionally washing and drying the polymer particles.

17. An electrophoretic fluid comprising polymer particles prepared by the process according to claim 16.

18. An optical display, electrooptical display, electronic display, electrochemical display, electrophotographic display, electrowetting display, electrophoretic display, optical device, electrooptical device, electronic device, electrochemical device, electrophotographic device, electrowetting device, electrophoretic device, in security applications, cosmetic applications, decorative applications or diagnostic applications comprising polymer particles according to claim 1.

19. A mono, bi or polychromal electrophoretic devices which comprises polymer particles according to claim 1.

20. An electrophoretic fluid comprising polymer particles according to claim 1.

21. An electrophoretic display device comprising an electrophoretic fluid according to claim 20.

22. The electrophoretic display device according to claim 21, wherein the electrophoretic fluid is applied by a technique selected from inkjet printing, slot die spraying, nozzle spraying, flexographic printing, contact printing, contactless printing or deposition technique.

* * * * *